US012744039B2

(12) United States Patent
Yao et al.

(10) Patent No.: US 12,744,039 B2
(45) Date of Patent: Sep. 22, 2026

(54) SPEECH RECOGNITION METHOD AND APPARATUS

(71) Applicant: Huawei Technologies Co., Ltd., Shenzhen (CN)

(72) Inventors: Xifeng Yao, Nanjing (CN); Kaiji Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 152 days.

(21) Appl. No.: 18/735,672

(22) Filed: Jun. 6, 2024

(65) Prior Publication Data

US 2024/0331694 A1 Oct. 3, 2024

Related U.S. Application Data

(63) Continuation of application No. PCT/CN2022/137124, filed on Dec. 7, 2022.

(30) Foreign Application Priority Data

Dec. 30, 2021 (CN) ........................ 202111659241.3

(51) Int. Cl.
*G10L 15/22* (2006.01)
*G06F 40/30* (2020.01)
(Continued)

(52) U.S. Cl.
CPC .............. *G10L 15/22* (2013.01); *G06F 40/30* (2020.01); *G10L 15/1822* (2013.01);
(Continued)

(58) Field of Classification Search
CPC ..... G10L 15/22; G10L 15/1822; G10L 15/26; G10L 25/54; G10L 25/63; G10L 2015/223; G10L 2015/228; G06F 40/30
(Continued)

(56) References Cited

U.S. PATENT DOCUMENTS 10,515,625 B1 * 12/2019 Metallinou ............. G06F 3/167
12,217,749 B1 * 2/2025 Anand ................ G10L 15/1815
2024/0331694 A1 * 10/2024 Yao ......................... G06F 40/30

FOREIGN PATENT DOCUMENTS

CN 104955592 A * 9/2015 ........... B22D 41/003
CN 104965592 A 10/2015
(Continued)

OTHER PUBLICATIONS

Konrad Gadzicki et al: "Early vs Late Fusion in Multimodal Convolutional Neural Networks," Jul. 6-9, 2020, total 6 pages.
(Continued)

*Primary Examiner* — Edwin S Leland, III
(74) *Attorney, Agent, or Firm* — Slater Matsil, LLP

(57) ABSTRACT

A speech recognition method and apparatus are provided. The speech recognition method includes: obtaining a first speech text (S510); obtaining modal information that matches the first speech text; and performing multimodal semantic understanding with reference to the first speech text and the modal information, to output an intention and a slot. According to the speech recognition method, an intention of a user can be accurately recognized, improving human-computer interaction efficiency and user experience.

14 Claims, 6 Drawing Sheets

(51) Int. Cl.
*G10L 15/18* (2013.01)
*G10L 15/26* (2006.01)
*G10L 25/54* (2013.01)
*G10L 25/63* (2013.01)

(52) U.S. Cl.
CPC .............. *G10L 15/26* (2013.01); *G10L 25/54* (2013.01); *G10L 25/63* (2013.01); *G10L 2015/223* (2013.01); *G10L 2015/228* (2013.01)

(58) Field of Classification Search
USPC .......................................................... 704/200
See application file for complete search history.

(56) References Cited

FOREIGN PATENT DOCUMENTS

| | | | | | |
|---|---|---|---|---|---|
| CN | 111008532 A | * | 4/2020 | ............. G10L 15/26 |
| CN | 111063162 A | * | 4/2020 | ......... G08B 21/0208 |
| CN | 111508482 A | * | 8/2020 | ............. G10L 15/22 |
| CN | 111966320 A | | 11/2020 | |
| CN | 112462940 A | | 3/2021 | |
| CN | 112613534 A | * | 4/2021 | ............. G06F 18/25 |
| CN | 112784798 A | * | 5/2021 | ........... G06F 18/253 |
| CN | 109902155 B | * | 7/2021 | |
| CN | 113806470 A | * | 12/2021 | ............. G06F 16/35 |

OTHER PUBLICATIONS

Sebastian Zambanini et al: “Early versus Late Fusion in a Multiple Camera Network for Fall Detection,” Jan. 2010, total 9 pages.

* cited by examiner

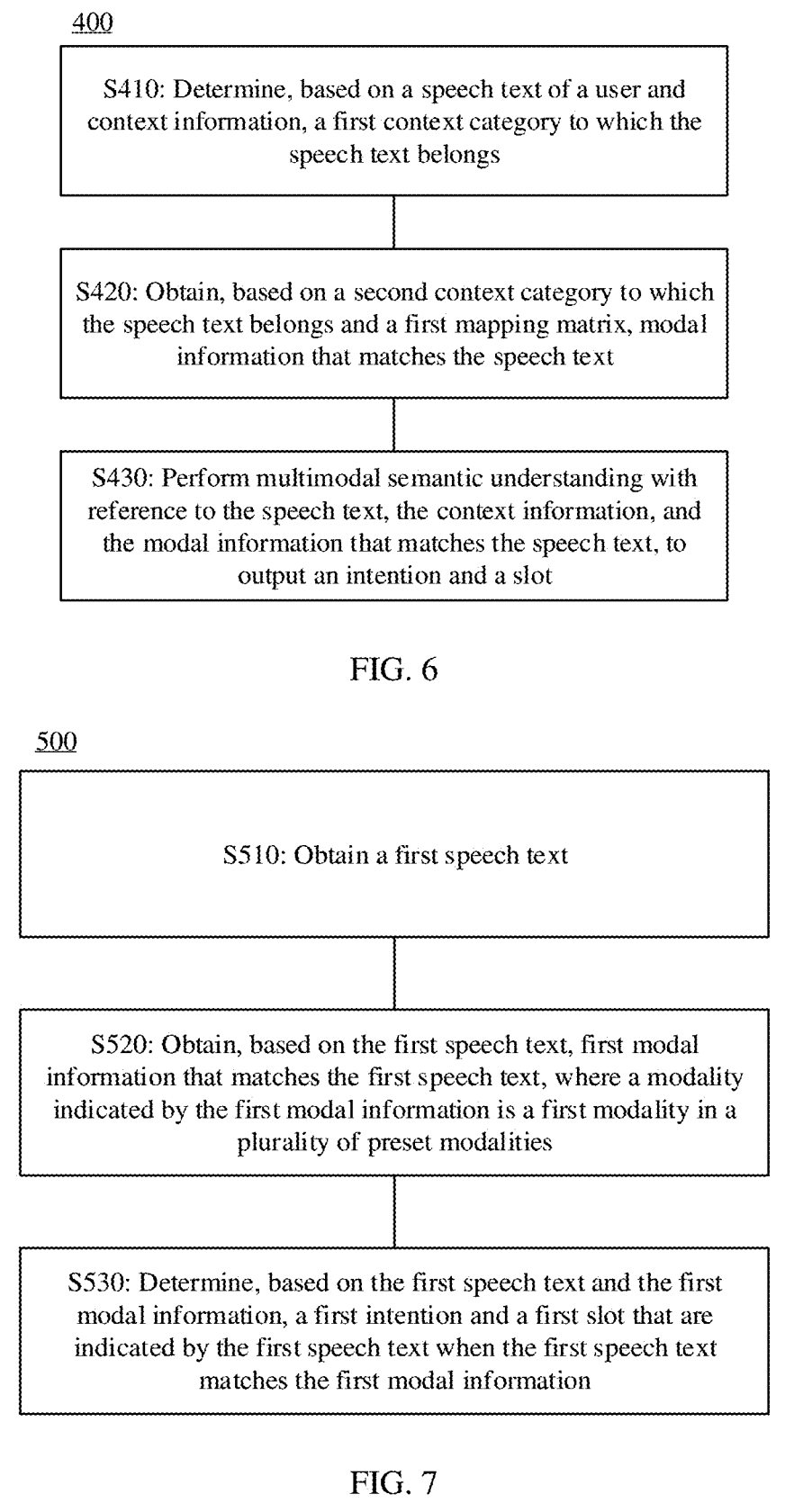

400

S410: Determine, based on a speech text of a user and context information, a first context category to which the speech text belongs S420: Obtain, based on a second context category to which the speech text belongs and a first mapping matrix, modal information that matches the speech text S430: Perform multimodal semantic understanding with reference to the speech text, the context information, and the modal information that matches the speech text, to output an intention and a slot

S510: Obtain a first speech text

S520: Obtain, based on the first speech text, first modal information that matches the first speech text, where a modality indicated by the first modal information is a first modality in a plurality of preset modalities S530: Determine, based on the first speech text and the first modal information, a first intention and a first slot that are indicated by the first speech text when the first speech text matches the first modal information

FIG. 7

SPEECH RECOGNITION METHOD AND APPARATUS

CROSS-REFERENCE TO RELATED APPLICATIONS

This application is a continuation of International Application No. PCT/CN2022/137124, filed on Dec. 7, 2022, which claims priority to Chinese Patent Application No. 202111659241.3, filed on Dec. 30, 2021. The disclosures of the aforementioned applications are hereby incorporated by reference in their entireties.

TECHNICAL FIELD

Embodiments of this application relate to the field of electronic devices, and more specifically, to a speech recognition method and apparatus.

BACKGROUND

Currently, human-computer interaction applications are widely applied to electronic devices such as a mobile phone, a tablet computer, and a smart sound box, and provide an intelligent human-computer interaction manner for a user. In a human-computer interaction process, the electronic device needs to accurately recognize an intention of the user, to provide an intelligent service for the user. However, due to complexity of natural language, the electronic device may incorrectly understand semantics that the user wants to express, reducing human-computer dialogue efficiency and affecting user experience.

SUMMARY

Embodiments of this application provide a speech recognition method, so that an intention of a user can be accurately understood with reference to a speech text and multimodal information.

According to a first aspect, a speech recognition method is provided, including: obtaining a first speech text; obtaining, based on the first speech text, first modal information that matches the first speech text, where a modality indicated by the first modal information is a first modality in a plurality of preset modalities; and determining, based on the first speech text and the first modal information, a first intention and a first slot that are indicated by the first speech text when the first speech text matches the first modality.

When the first speech text matches the first modality, the first speech text indicates the first intention. When the first speech text indicates the first intention, the first speech text matches the first modality.

In this application, the first modal information that matches the speech text is modal information of one or more of the plurality of preset modalities. The modal information includes modal data, or a modal feature code obtained by performing encoding processing on the modal data.

According to this solution, multimodal semantic understanding may be performed with reference to a speech text and modal information that matches the speech text. Therefore, an intention of a user can be accurately understood, improving human-computer dialogue efficiency and user experience.

With reference to the first aspect, in a possible implementation, the obtaining, based on the first speech text, first modal information that matches the first speech text includes: obtaining a multimodal selection vector based on the first speech text, where the multimodal selection vector indicates a probability of relevance between the first speech text and each of the plurality of preset modalities; and obtaining the first modal information based on the multimodal selection vector.

In this embodiment of this application, the modal information that matches the speech text may be obtained based on a probability of relevance between the speech text and each preset modality. In this way, during subsequent multimodal semantic understanding, the intention indicated by the speech text can be understood with reference to the modal information. Therefore, accuracy of semantic understanding is improved, improving human-computer dialogue efficiency and user experience.

With reference to the first aspect, in a possible implementation, the obtaining a multimodal selection vector based on a first speech text includes: determining a first context category to which the first speech text belongs; and obtaining the multimodal selection vector based on the first context category, where the multimodal selection vector indicates a probability of relevance between the first context category and each of the plurality of preset modalities.

In this embodiment of this application, a plurality of context categories may be preset. A plurality of speech texts with different content may belong to a same context category, and speech texts belonging to a same context category are semantically similar. For example, both "The temperature is too high today" and "It is too hot" may represent hot semantics. If another factor is not considered, both may belong to a hotness context category.

According to this solution, a context category of the speech text is divided, and then a multimodal selection vector is obtained based on the context category to which the speech text belongs, to obtain the modal information that matches the speech text. In this way, when the modal information that matches the speech text is determined, only the context category to which the speech text belongs needs to be determined, that is, a modality related to the speech text may be selected, to obtain the modal information that matches the speech text. Therefore, time spent in obtaining the modal information that matches the speech text can be reduced, improving human-computer dialogue efficiency.

With reference to the first aspect, in a possible implementation, the obtaining the multimodal selection vector based on the first context category includes: obtaining the multimodal selection vector based on the first context category and a first mapping matrix, where the first mapping matrix indicates a plurality of context categories and a plurality of multimodal selection vectors, each multimodal selection vector indicates one or more modalities, and the plurality of context categories are in a one-to-one correspondence with the plurality of multimodal selection vectors.

The first mapping matrix may be preset. In the first mapping matrix, the plurality of context categories and the plurality of multimodal selection vectors may be preset. Each preset context category corresponds to one multimodal selection vector, and the multimodal selection vector indicates one or more of the plurality of preset modalities. In other words, in the first mapping matrix, a mapping relationship between the context category and the multimodal selection vector is established, or a mapping relationship between the context category and the preset modality is established.

In this way, after the context category to which the first speech text belongs is determined, the multimodal selection vector or the modality corresponding to the context category to which the speech text belongs can be obtained based on the first mapping matrix, to obtain the modal information that matches the speech text. Therefore, time spent in obtaining the modal information that matches the speech text is reduced, improving human-computer interaction efficiency.

Optionally, the modal information that matches the speech text is obtained based on the first context category and the first mapping matrix.

It should be understood that the first mapping matrix may include modal information of the plurality of preset modalities. For example, after modal information of each preset modality is obtained, the modal information is stored in the first mapping matrix.

In this way, after the context category to which the speech text belongs is determined, the modal information that matches the speech text may be obtained from the first mapping matrix. Therefore, efficiency in obtaining the modal information that matches the speech text is improved, and time spent in speech recognition is reduced.

With reference to the first aspect, in a possible implementation, the method further includes: obtaining the modal information of the plurality of preset modalities.

In this way, the modal information of each preset modality is obtained in advance, to avoid obtaining the modal information in a human-computer interaction process, improving human-computer interaction efficiency and user experience.

Optionally, after the multimodal selection vector or the modality related to the speech text is determined, only modal information of the related modality is obtained.

In this way, in a human-computer interaction process, the modal information that matches the speech text may be obtained in a targeted manner, reducing resources and power.

Optionally, the modal information of each of the plurality of preset modalities is periodically obtained.

According to this solution, it can be ensured that modal information in a human-computer interaction process is latest modal information. Therefore, accuracy of understanding the intention indicated by the speech text is improved, improving human-computer interaction efficiency and user experience.

With reference to the first aspect, in a possible implementation, the method further includes: obtaining the first modal information based on the multimodal selection vector and the modal information of the plurality of preset modalities.

In this way, the modal information that matches the speech text may be obtained from the modal information of the plurality of preset modalities in a centralized manner based on the modal information of the plurality of preset modalities that is obtained in advance and the multimodal selection vector, to avoid obtaining the modal information in a manner such as by using a distributed sensor in a human-computer interaction process, improving human-computer interaction efficiency and user experience.

With reference to the first aspect, in a possible implementation, the determining a first context category to which the first speech text belongs includes: determining, based on the first speech text and/or context information of the first speech text, the first context category to which the first speech text belongs.

When the context category to which the first speech text belongs is determined with reference to the context information, it helps determine the real context category of the speech text. When the speech text cannot clearly indicate the current context category, but the context information may indicate the current context category, it helps determine the context category of the speech text. In this way, correct modal information is selected to perform multimodal semantic understanding, and the intention indicated by the speech text is determined. Therefore, a semantic recognition error is reduced, and human-computer interaction frequency is reduced, improving human-computer interaction efficiency and user experience.

With reference to the first aspect, in a possible implementation, the determining, based on the first speech text and/or context information of the first speech text, the first context category to which the first speech text belongs includes: obtaining a text feature code of the first speech text and/or the context information of the first speech text; and determining, based on the text feature code and a first classification layer, the first context category to which the first speech text belongs, where the first classification layer is used to map the first speech text to one of a plurality of preset context categories.

In this way, with reference to the first speech text and/or the context information, the context category to which the first speech text belongs can be more accurately determined, to obtain correct modal information to perform multimodal semantic understanding, and determine the intention of the user. Therefore, human-computer interaction frequency is reduced, improving human-computer interaction efficiency and user experience.

With reference to the first aspect, in a possible implementation, the first modal information includes a first modal feature code; and the determining, based on the first speech text and the first modal information, a first intention and a first slot that are indicated by the first speech text when the first speech text matches the first modal information includes: determining, based on the text feature code, the first modal feature code, and a second classification layer, the first intention and the first slot that are indicated by the first speech text in the first modality, where the second classification layer is used to map the first speech text to one of a plurality of preset intentions.

In this way, the intention indicated by the speech text can be accurately determined with reference to a text feature code of the speech text and the modal information that matches the speech text. Therefore, human-computer interaction frequency is reduced, improving human-computer interaction efficiency and user experience.

With reference to the first aspect, in a possible implementation, the method further includes: performing an operation related to the first intention.

In this application, after the intention of the user is determined, an operation related to the intention may be performed. For example, if the intention of the user is "enabling adaptive cruise", an operation related to enabling the adaptive cruise is performed, including querying and obtaining a vehicle speed setting and a vehicle following distance setting of the user to fill in a slot corresponding to "enabling adaptive cruise", or directly enabling the adaptive cruise based on a current vehicle speed and a default vehicle following distance. In this way, an intelligent service can be provided for the user, to meet a requirement of the user, improving user experience.

With reference to the first aspect, in a possible implementation, the obtaining a multimodal selection vector based on the first speech text includes: obtaining the multimodal selection vector based on the first speech text and a third classification layer, where the third classification layer is used to determine the probability of relevance between the first speech text and each of the plurality of preset modalities.

In this application, the third classification layer is trained to learn a modality that matches the speech text. When a new speech text is input, a mapping relationship between the speech text and the modality can be automatically established based on content or a feature of the speech text, so that a probability of relevance between the speech text and each preset modality is determined, and a multimodal selection vector represents the probability. In this way, accurate analysis can be provided on very a large data set and impact of human beings can be reduced. In addition, the mapping matrix may not be preset, to reduce a step of obtaining the modal information that matches the speech text, improving human-computer interaction efficiency.

Optionally, the third classification layer is trained, by using a large quantity of speech text with one or more modal labels, to learn the modality that matches the speech text.

Optionally, the multimodal selection vector is obtained based on the first speech text, the context information of the first speech text, and the third classification layer, where the third classification layer is used to determine the probability of relevance between the first speech text and each of the plurality of preset modalities.

In this way, the third classification layer may accurately select, based on all features of the speech text and the context information, the modality related to the speech text, obtain the modal information that matches the speech text, and understand, with reference to the modal information and the context information, the intention indicated by the speech text. Therefore, accuracy of semantic understanding is improved, improving human-computer dialogue efficiency and user experience.

With reference to the first aspect, in a possible implementation, the method further includes: obtaining a second speech text, where content of the second speech text is the same as content of the first speech text; obtaining second modal information that matches the second speech text, where a modality indicated by the second modal information is a second modality in the plurality of preset modalities, and the second modality is different from the first modality; and determining, based on the second speech text and the second modal information, a second intention and a second slot that are indicated by the second speech text when the second speech text matches the second modal information, where the second intention is different from the first intention, and/or the second slot is different from the first slot.

According to a second aspect, a speech recognition apparatus is provided, including: an obtaining unit, configured to obtain a first speech text; and a processing unit, configured to: obtain, based on the first speech text, first modal information that matches the first speech text, where a modality indicated by the first modal information is a first modality in a plurality of preset modalities; and determine, based on the first speech text and the first modal information, a first intention and a first slot that are indicated by the first speech text when the first speech text matches the first modality.

According to the speech recognition apparatus provided in this embodiment of this application, multimodal semantic understanding may be performed with reference to a speech text and modal information that matches the speech text. Therefore, an intention indicated by the speech text is accurately determined, helping improve human-computer interaction efficiency and user experience.

With reference to the second aspect, in a possible implementation, the processing unit is specifically configured to: obtain a multimodal selection vector based on the first speech text, where the multimodal selection vector indicates a probability of relevance between the first speech text and each of the plurality of preset modalities; and obtain the first modal information based on the multimodal selection vector.

With reference to the second aspect, in a possible implementation, the processing unit is specifically configured to: determine a first context category to which the first speech text belongs; and obtain the multimodal selection vector based on the first context category, where the multimodal selection vector indicates a probability of relevance between the first context category and each of the plurality of preset modalities.

With reference to the second aspect, in a possible implementation, the processing unit is specifically configured to obtain the multimodal selection vector based on the first context category and a first mapping matrix, where the first mapping matrix indicates a plurality of context categories and a plurality of multimodal selection vectors, each multimodal selection vector indicates one or more modalities, and the plurality of context categories are in a one-to-one correspondence with the plurality of multimodal selection vectors.

With reference to the second aspect, in a possible implementation, the processing unit is specifically configured to obtain the multimodal selection vector based on the first context category and the first mapping matrix, where the first mapping matrix indicates the plurality of context categories and the plurality of multimodal selection vectors, each multimodal selection vector indicates one or more modalities, and the plurality of context categories are in a one-to-one correspondence with the plurality of multimodal selection vectors. With reference to the second aspect, in a possible implementation, the processing unit is further configured to obtain modal information of the plurality of preset modalities.

With reference to the second aspect, in a possible implementation, the processing unit is specifically configured to obtain the first modal information based on the multimodal selection vector and the modal information of the plurality of preset modalities.

With reference to the second aspect, in a possible implementation, the processing unit is specifically configured to determine, based on the first speech text and/or context information of the first speech text, the first context category to which the first speech text belongs.

With reference to the second aspect, in a possible implementation, the processing unit is specifically configured to: obtain a text feature code of the first speech text and/or the context information of the first speech text; and determine, based on the text feature code and a first classification layer, the first context category to which the first speech text belongs, where the first classification layer is used to map the first speech text to one of a plurality of preset context categories.

With reference to the second aspect, in a possible implementation, the processing unit is specifically configured to determine, based on the text feature code, the first modal feature code, and a second classification layer, the first intention and the first slot that are indicated by the first speech text in the first modality, where the second classification layer is used to map the first speech text to one of a plurality of preset intentions.

With reference to the second aspect, in a possible implementation, the processing unit is further configured to perform an operation related to the first intention.

With reference to the second aspect, in a possible implementation, the processing unit is further configured to obtain the multimodal selection vector based on the first speech text and a third classification layer, where the third classification layer is used to determine the probability of relevance between the first speech text and each of the plurality of preset modalities.

With reference to the second aspect, in a possible implementation, the processing unit is further configured to: obtain a second speech text, where content of the second speech text is the same as content of the first speech text; obtain second modal information that matches the second speech text, where a modality indicated by the second modal information is a second modality in the plurality of preset modalities, and the second modality is different from the first modality; and determine, based on the second speech text and the second modal information, a second intention and a second slot that are indicated by the second speech text when the second speech text matches the second modal information, where the second intention is different from the first intention, and/or the second slot is different from the first slot.

According to a third aspect, a speech recognition apparatus is provided, including: a memory, configured to store a computer program; and a processor, configured to execute the computer program stored in the memory, so that the apparatus performs the speech recognition method in any one of the possible implementations of the first aspect.

With reference to the third aspect, in a possible implementation, the speech recognition apparatus is an electronic device.

According to a fourth aspect, a computer-readable storage medium is provided. The computer-readable storage medium stores computer-executable instructions, and when the computer-executable instructions are run on a computer, the computer is enabled to perform the speech recognition method in any possible implementation of the first aspect.

According to a fifth aspect, a computer program product is provided. The computer program product includes computer program code, and when the computer program code is run on a computer, the computer is enabled to perform the speech recognition method in any possible implementation of the first aspect.

According to a sixth aspect, a chip system is provided, including at least one processor. When program instructions are executed in the at least one processor, the at least one processor is enabled to perform the speech recognition method in any possible implementation of the first aspect.

BRIEF DESCRIPTION OF THE DRAWINGS

FIG. 6 is a schematic flowchart of a speech recognition method according to an embodiment of this application;

FIG. 7 is a schematic flowchart of another speech recognition method according to an embodiment of this application;

DETAILED DESCRIPTION OF ILLUSTRATIVE EMBODIMENTS

Terms used in the following embodiments are merely intended to describe specific embodiments, but are not intended to limit this application. Singular expressions "one", "a", "the", "the foregoing", "this", and "the one" used in this specification and the appended claims of this application are also intended to include expressions such as "one or more", unless otherwise specified in the context clearly. It should also be further understood that in the following embodiments of this application, "at least one" or "one or more" means one, two, or more. The term "and/or" describes an association relationship between associated objects and indicates that three relationships may exist. For example, A and/or B may indicate the following cases: Only A exists, both A and B exist, and only B exists, where A and B may be singular or plural. The character "/" generally indicates an "or" relationship between associated objects.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in other embodiments", and "in some other embodiments" that appear at different places in this specification do not necessarily mean reference to a same embodiment. Instead, the statements mean "one or more but not all of embodiments", unless otherwise specifically emphasized in another manner. The terms "include", "comprise", "have", and their variants all mean "include but are not limited to", unless otherwise specifically emphasized in another manner.

The following describes an electronic device, a user interface used for the electronic device, and an embodiment in which the electronic device is used. In some embodiments, the electronic device may be a portable electronic device that further includes another function such as a personal digital assistant function and/or a music player function, for example, a mobile phone, a tablet computer, or a wearable electronic device (for example, a smartwatch) having a wireless communication function. An example embodiment of the portable electronic device includes but is not limited to a portable electronic device using iOS®, Android®, Microsoft®, or another operating system. The foregoing portable electronic device may be another portable electronic device, such as a laptop computer. It should be further understood that, in some other embodiments, the foregoing electronic device may not be a portable electronic device but a desktop computer or the like.

Figure 1:
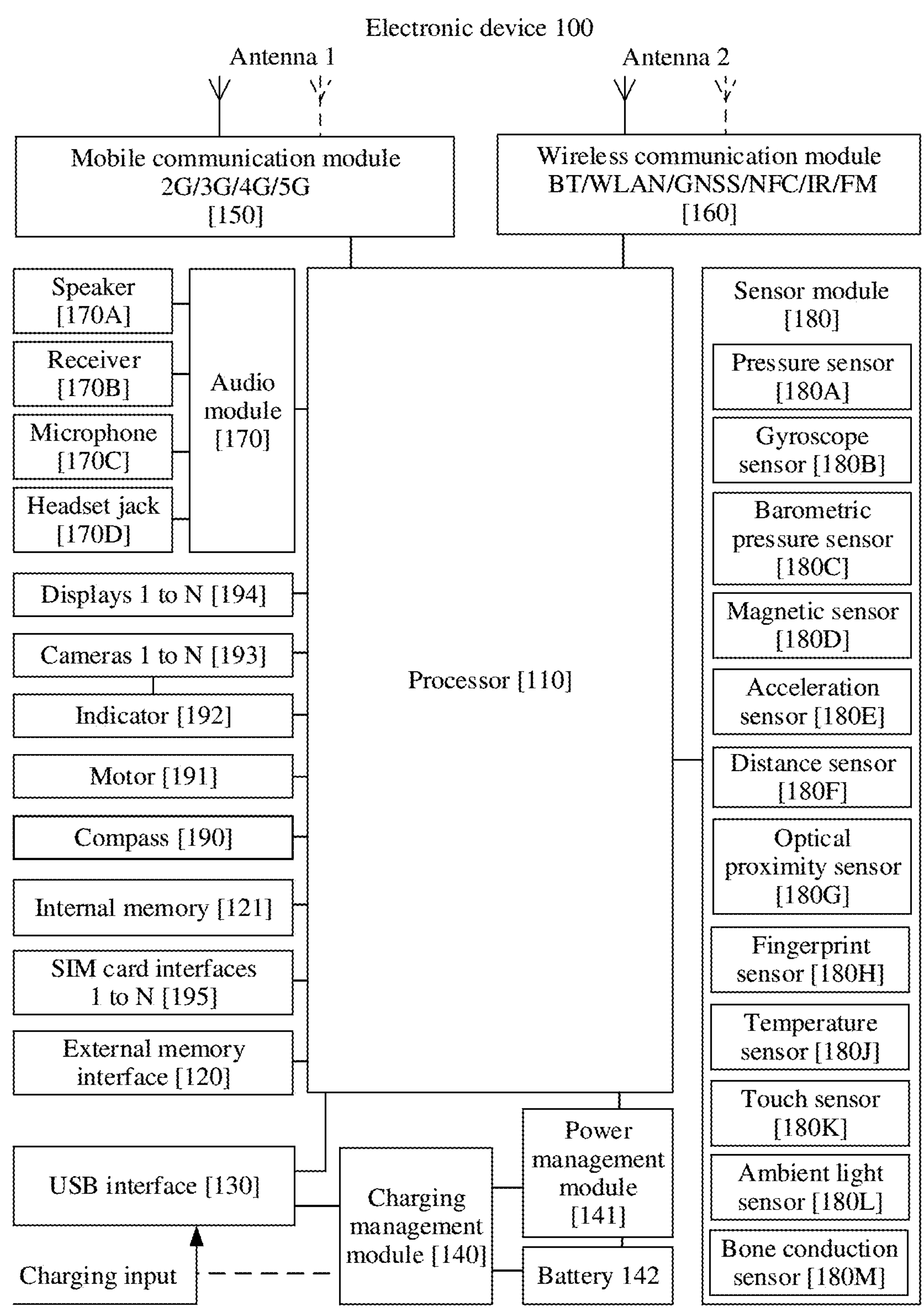
FIG. 1 is a schematic diagram of a hardware structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a compass 190, a motor 191, an indicator 192, a camera 193, a display 194, a subscriber identity module (SIM) card interface 195, and the like.

It may be understood that the structure shown in this embodiment of this application does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors. In some embodiments, the electronic device 100 may alternatively include one or more processors 110. The controller may generate an operation control signal based on an instruction operation encoding and a time sequence signal to complete control of instruction fetching and instruction execution. In some other embodiments, a memory may be further disposed in the processor 110, and is configured to store instructions and data. For example, the memory in the processor 110 may be a cache. The memory may store instructions or data just used or cyclically used by the processor 110. If the processor 110 needs to use the instructions or the data again, the processor 110 may directly invoke the instructions or the data from the memory. In this way, repeated access is avoided and a waiting time of the processor 110 is reduced, so that efficiency of processing data or executing instructions by the electronic device 100 is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM card interface, a USB interface, and/or the like. The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device. The USB interface 130 may alternatively be configured to connect to a headset, and play audio by using the headset.

It may be understood that an interface connection relationship between the modules illustrated in this embodiment of this application is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect to the battery 142, the charging management module 140, and the processor 110. The power management module 141 receives input of the battery 142 and/or the charging management module 140, and supplies power to the processor 110, the internal memory 121, an external memory, the display 194, the camera 193, the wireless communication module 160, and the like. The power management module 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be multiplexed to improve antenna utilization. For example, the antenna 1 may be multiplexed as a diversity antenna in a wireless local area network. In some other embodiments, an antenna may be used in combination with a tuning switch.

The mobile communication module 150 may provide a wireless communication solution including 2G/3G/4G/5G that is applied to the electronic device 100. The mobile communication module 150 may include at least one filter, a switch, a power amplifier, a low noise amplifier (LNA), and the like. The mobile communication module 150 may receive an electromagnetic wave through the antenna 1, perform processing such as filtering and amplification on the received electromagnetic wave, and then transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same component.

The wireless communication module 160 may provide a wireless communication solution applied to the electronic device 100, for example, a wireless local area network (WLAN) (for example, a wireless fidelity (Wi-Fi) network), Bluetooth (BT), a global navigation satellite system (GNSS), frequency modulation (FM), a near field communication (NFC) technology, and an infrared (IR) technology. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

The electronic device 100 implements a display function by using the GPU, the display 194, the application processor, and the like. The GPU is a microprocessor for image processing and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may use a liquid crystal display (LCD), an organic light-emitting diode (OLED), an active-matrix organic light-emitting diode (AMOLED), a flex light-emitting diode (FLED), a mini-LED, a micro-LED, a micro-OLED, a quantum dot light-emitting diode (QLED), or the like. In some embodiments, the electronic device 100 may include one or more displays 194.

In some embodiments of this application, when the display panel is made of a material such as the OLED, the AMOLED, or the FLED, the display 194 in FIG. 1 may be bent. Herein, that the display 194 may be bent means that the display may be bent to any angle at any part, and may be held at the angle. For example, the display 194 may be folded left and right from the middle. Alternatively, the display 194 may be folded up and down from the middle.

The display 194 of the electronic device 100 may be a flexible display. Currently, the flexible display attracts much attention due to a unique feature and huge potential of the flexible display. Compared with a conventional display, the flexible display has features of strong flexibility and bendability, and may provide a user with a new bendability-based interaction manner, to satisfy more requirements of the user on an electronic device. For an electronic device configured with a foldable display, the foldable display of the electronic device may be switched between a small screen in a folded form and a large screen in an unfolded form at any time. Therefore, the user uses a split-screen function more frequently on the electronic device provided with the foldable display.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and a skin color of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 100 may include one or more cameras 193.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to: compress or decompress a digital video. The electronic device 100 may support one or more types of video codecs. Therefore, the electronic device 100 may play or record videos in a plurality of coding formats, for example, moving picture experts group (MPEG)-1, MPEG-2, MPEG-3, MPEG-4, and the like.

The NPU is a neural-network (NN) computing processor, quickly processes input information by referring to a biological neural network, for example, by referring to a transfer mode between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store one or more computer programs. The one or more computer programs include instructions. The processor 110 may run the instructions stored in the internal memory 121, so that the electronic device 100 performs the payment method provided in some embodiments of this application, various applications, data processing, and the like. The internal memory 121 may include a program storage area and a data storage area. The program storage area may store an operating system. The program storage area may further store one or more applications (for example, Gallery and Contacts), and the like. The data storage area may store data (for example, a photo and a contact), and the like created when the electronic device 100 is used. In addition, the internal memory 121 may include a high-speed random access memory, and may further include a nonvolatile memory, for example, one or more magnetic disk storage devices, a flash memory, or a universal flash storage (UFS). In some embodiments, the processor 110 may run the instructions stored in the internal memory 121 and/or the instructions stored in the memory that is disposed in the processor 110, so that the electronic device 100 performs the payment method provided in embodiments of this application, another application, and data processing. The electronic device 100 may implement audio functions, such as music playing and recording by using the audio module 170, the speaker 170A, the receiver 170B, the microphone 170C, the headset jack 170D, the application processor, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and may convert the pressure signal into an electrical signal. In some embodiments, the pressure sensor 180A may be disposed on the display 194. There are a plurality of types of pressure sensors 180A, for example, a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may calculate a touch location based on a detection signal of the pressure sensor 180A. In some embodiments, touch operations that are performed at a same touch location but have different touch intensity may correspond to different operation instructions. For example, when a touch operation whose touch intensity is less than a first pressure threshold is performed on an SMS message application icon, an instruction for viewing an SMS message is performed. When a touch operation whose touch operation intensity is greater than or equal to a first pressure threshold is performed on the application icon "Messages", an instruction for creating an SMS message is performed.

The gyroscope sensor 180B may be configured to determine a motion posture of the electronic device 100. In some embodiments, angular velocities of the electronic device 100 around three axes (namely, X, Y, and Z axes) may be determined by using the gyroscope sensor 180B. The gyroscope sensor 180B may be configured to implement image stabilization during photographing. For example, when a shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement the image stabilization. The gyroscope sensor 180B may further be used in a navigation scenario and a somatic game scenario.

The acceleration sensor 180E may detect accelerations in various directions (usually on three axes) of the electronic device 100. When the electronic device 100 is still, a magnitude and a direction of gravity may be detected. The acceleration sensor 180E may be further configured to recognize a posture of the electronic device, and is used in an application such as switching between a landscape mode and a portrait mode or a pedometer.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement unlocking by using the fingerprint, access an application lock, take a photo by using the fingerprint, answer a call by using the fingerprint, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 reduces performance of a processor near the temperature sensor 180J, to reduce power consumption and implement thermal protection. In some other embodiments, when the temperature is lower than another threshold, the electronic device 100 heats the battery 142 to avoid abnormal shutdown of the electronic device 100 caused by a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194. The touch sensor 180K and the display 194 constitute a touchscreen, which is also referred to as a "touch control screen". The touch sensor 180K is configured to detect a touch operation performed on or near the touch sensor 180K. The touch sensor may transfer the detected touch operation to the application processor to determine a type of a touch event. A visual output related to the touch operation may be provided on the display 194. In some other embodiments, the touch sensor 180K may alternatively be disposed on a surface of the electronic device 100 at a position different from that of the display 194.

Figures 2, 3:
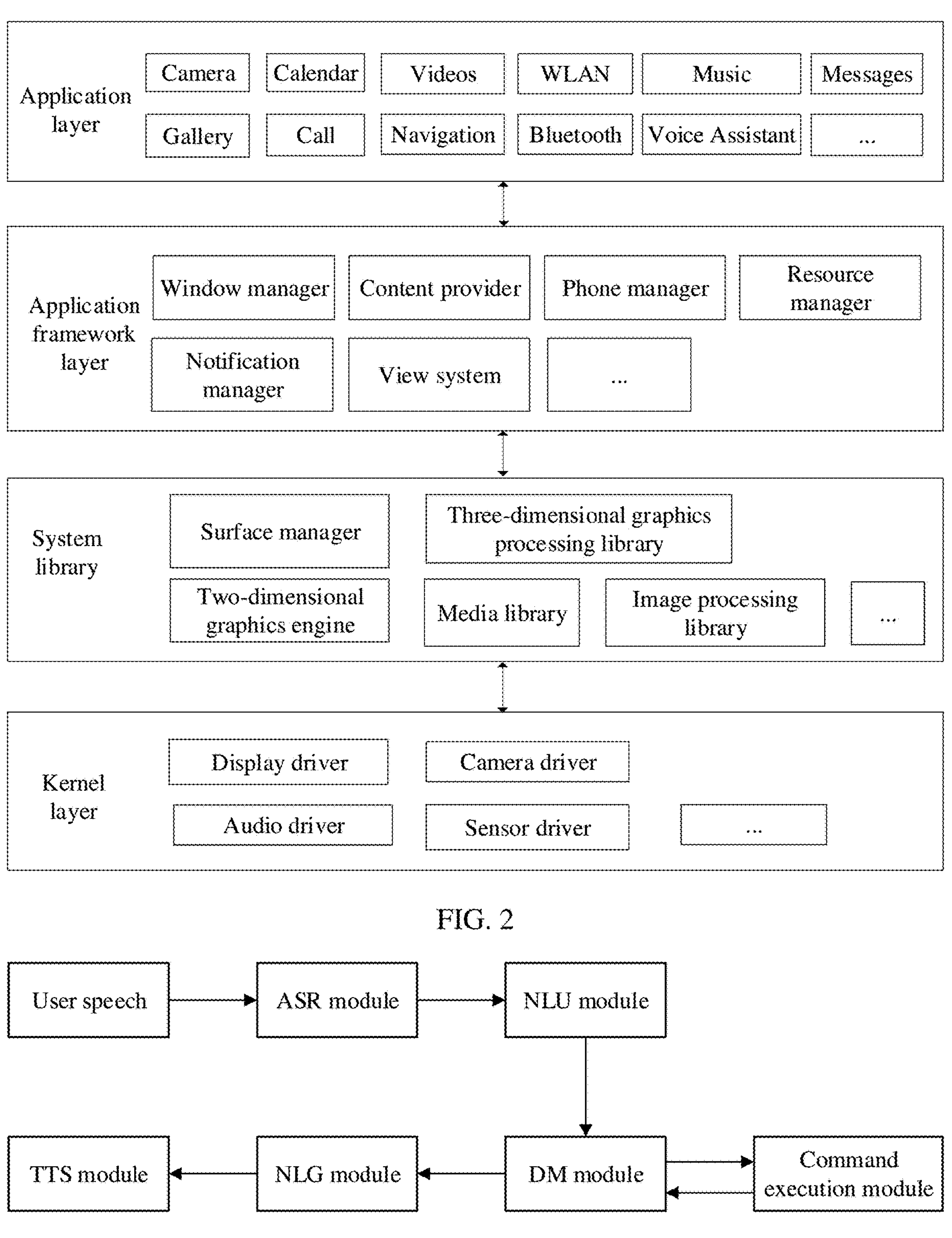
FIG. 2 is a schematic diagram of a software structure of an electronic device according to an embodiment of this application.
FIG. 3 is a schematic flowchart of a human-computer interaction process according to an embodiment of this application.

FIG. 2 is a block diagram of a software structure of an electronic device 100 according to an embodiment of this application. In a layered architecture, software is divided into several layers, and each layer has a clear role and task. The layers communicate with each other through a software interface. In some embodiments, an Android system is divided into four layers: an application layer, an application framework layer, Android runtime and a system library, and a kernel layer from top to bottom. The application layer may include a series of application packages.

As shown in FIG. 2, the application packages may include applications such as Camera, Gallery, Calendar, Call, Maps, Navigation, WLAN, Bluetooth, Music, Videos, Messages, and Voice Assistant.

The application framework layer provides an application programming interface (API) and a programming framework for an application at the application layer, and the application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, or the like.

The content provider is configured to store and obtain data, and enable the data to be accessed by an application. The data may include a video, an image, audio, calls that are made and received, a browsing history, a bookmark, an address book, and the like.

The view system includes visual controls, such as a control for displaying a text and a control for displaying an image. The view system may be configured to construct the application. A display interface may include one or more views. For example, a display interface including a notification icon of Messages may include a text display view and a picture display view.

The phone manager is configured to provide a communication function for the electronic device 100, for example, management of a call status (including answering, declining, or the like).

The resource manager provides various resources for the application, such as a localized character string, an icon, an image, a layout file, and a video file.

The notification manager enables the application to display notification information in the status bar, and may be configured to transmit a notification-type message. The notification manager may automatically disappear after a short pause without requiring user interaction. For example, the notification manager is configured to notify download completion, provide a message notification, and the like. The notification manager may alternatively be a notification that appears in a top status bar of the system in a form of a graph or a scroll bar text, for example, a notification of an application that is run on a background or a notification that appears on a screen in a form of a dialog window. For example, text information is prompted in the status bar, an alert tone is played, an electronic device vibrates, or an indicator light blinks.

The system library may include a plurality of functional modules, for example, a surface manager, a media library, a three-dimensional graphics processing library (for example, an OpenGL ES), and a 2D graphics engine (for example, an SGL).

The surface manager is configured to manage a display subsystem and provides fusion of 2D and 3D layers for a plurality of applications.

The media library supports playback and recording in a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The voice assistant application in the application packages is a type of human-computer interaction application, and the voice assistant application may also be referred to as a smart assistant application, or the like.

The human-computer interaction application may also be referred to as a human-computer interaction robot, a human-computer dialogue robot, a chat robot (ChatBOT), or the like. Currently, the human-computer interaction application is widely applied to a plurality of types of electronic devices such as a mobile phone, a tablet computer, and a smart sound box, to provide an intelligent speech interaction manner for the user. Currently, the user may perform human-computer interaction in a vehicle by using speech, and can not only control vehicle software such as navigation and music by using the speech, but also control vehicle hardware such as a vehicle window and an air conditioner.

FIG. 3 is a schematic flowchart of a human-computer interaction process. As shown in FIG. 3, the entire human-computer interaction process may be implemented by using a speech recognition (ASR) module, a semantic understanding (NLU) module, a dialog management (DM) module, a dialog generation (NLG) module, a speech broadcast (text to speech, TTS) module, and the like. A main function of the ASR module is to recognize a user's speech as a speech text. A main function of the NLU module is to understand an intention of a user and analyze a slot based on the speech text. The DM module may select a next action that needs to be performed based on an intention and a slot output by the NLU, for example, continue to query the user, execute a user instruction, or recommend another instruction to the user. A main function of the NLG module is to generate a dialog. A main function of the TTS module is to broadcast a dialog to the user.

The following describes several important concepts in the human-computer interaction process in detail.

The NLU module is mainly configured to convert the speech text into structured information that can be understood by a machine. In a dialog system, understanding the speech text means that the speech text is converted into executable intentions and slots that are used to meet a user requirement through a proper application. A typical implementation is as follows: A classification model is used to classify the speech text into the intention supported by the system, and then a sequence marking model is used to mark the slot in the text. Based on the two results, understanding results of the intention and the slot are output for a subsequent module to use.

For example, the user expresses: Help me book an air ticket from Beijing to Shanghai at 10 a.m. tomorrow. From this sentence, the NLU module may parse content shown in Table 1.

TABLE 1

| | |
|---|---|
| Intention (intent) | "Book an air ticket" |
| Slot | Departure time = "10 a.m. tomorrow" |
| | Starting place = "Beijing" |
| | Destination = "Shanghai" |

In the foregoing example, two concepts are mentioned: the intention and the slot. The following describes the two concepts in detail.

Intention

The intention may be understood as an intention classification, to determine which intention classification of a sentence expressed by the user. Then, a program corresponding to the type performs special parsing. In an implementation, "a program corresponding to the type" may be a bot. For example, the user says: "Play a happy song to me". The NLU module determines that an intention classification of the user is music, and therefore calls out a music bot to recommend a song to the user for playing. When the user feels something wrong while listening to the song, the user says: "Change a song", and the music bot continues to serve the user until the user expresses another question. When the intention is no longer music, another bot is switched to serve the user.

Slot

One or more slots may be preset for each intention. For example, in the foregoing example, three slots are defined under the intention "book an air ticket", which are "departure time", "starting place", and "destination". If we need to comprehensively consider content that the user needs to input for booking an air ticket, we can think of more content, such as a quantity of passengers, an airline, a departure airport, and a landing airport. For a speech interaction designer, a design starting point is to define a slot.

After the intention of the user is determined through semantic understanding, slot information in the speech text may be extracted for slot filling. Slot information may be understood as information related to a slot. For example, in the foregoing example of "book an air ticket", slot information corresponding to "departure time", "starting place", and "destination" is "10 a.m. tomorrow", "Beijing", and "Shanghai" respectively.

In some scenarios, slot information provided by a speech text of the user is missing.

For example, the user expresses "Help me book an air ticket at 10 a.m. tomorrow". In this case, it may be determined, through semantic understanding, that an intention of the user is to "book an air ticket", and slots related to the intention are "departure time", "starting place", and "destination". However, the statement expressed by the user contains only slot information of "departure time", and slot information of "starting place" and "destination" is missing. In this case, the intention output by the NLU modal is to "book an air ticket", and the slots are "starting place=empty", "departure time=10 a.m. tomorrow", and "destination=empty".

In this case, the DM module may control the NLG module to generate a dialog for querying the user about the missing slot information.

For example, the user: I want to book an air ticket.

BOT: Where is the destination?

User: Shanghai.

BOT: What time would you like to book a flight for departure?

After the user supplements all slot information in the intention of "book an air ticket", the DM module may control a command execution module to perform an operation of "book an air ticket". For example, the command execution module may open an air ticket booking app, and display information about a flight from Beijing to Shanghai at 10:00 a.m. (or around 10:00 a.m.).

It should be understood that the slot output by the NLU module may be completely filled, or may be missing slot information. In embodiments of this application, the slot that is completely filled and the slot that is missing slot information are collectively referred to as the slot.

On the basis of a full development of speech recognition technologies, we can accurately recognize the user's speech and convert the speech into the speech text. However, the electronic device may misunderstand the intention of the user, in other words, there is an error in semantic understanding of the user's speech text. This results in generation of an incorrect instruction and execution of an operation that does not conform to the intention of the user, greatly reducing human-computer dialogue efficiency and user experience.

That there is an error in semantic understanding of the speech text may be because a context of the user during the human-computer dialogue is not considered. Even two speech texts with same text content may have different semantics in different contexts. Therefore, the electronic device may misunderstand the intention of the user.

In embodiments of this application, to improve accuracy in understanding the intention of the user of the electronic device, semantic understanding based on multimodal information is introduced.

A modality may be widely defined. A source or a form of each type of information may be referred to as a modality. For example, a person has a sense of touch, a sense of hearing, a sense of vision, and a sense of smell. An information medium includes speech, a video, a text, and the like. Various sensors include such as a radar, infrared, and an accelerometer. Each of the foregoing may be referred to as a modality.

Modal information is specific data of the modality, and the modal information may also have another representation form, for example, a modal feature code obtained by performing encoding processing on the modal data.

For example, in a vehicle traveling scenario, a vehicle traveling speed (for example, 30 km/h), an air conditioner temperature status (for example, 30° C.), a music play status (for example, being played or not played), a navigation volume, and a music volume may all be considered as modal information.

Figure 4:
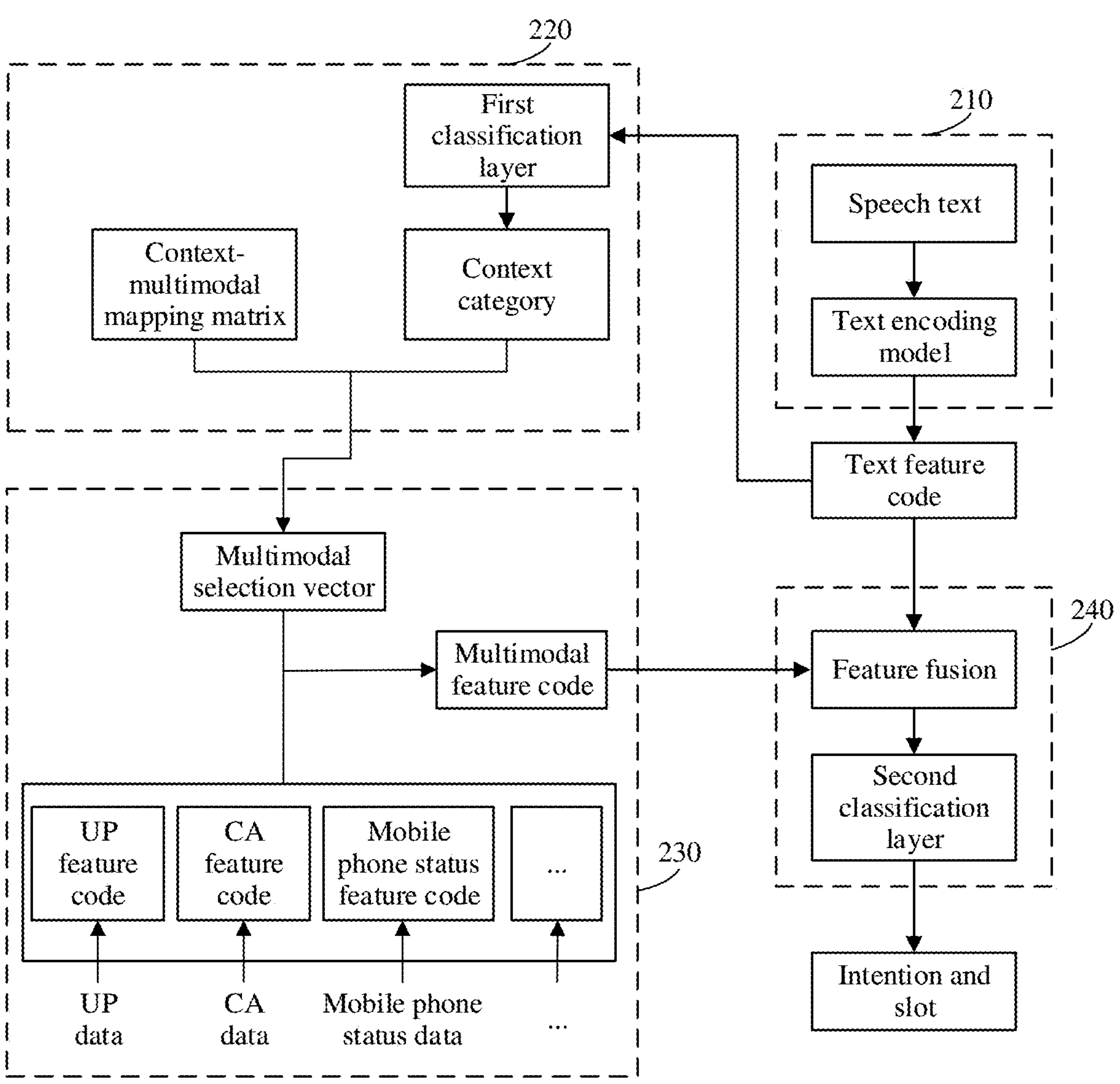
FIG. 4 is a schematic diagram of a speech recognition method according to an embodiment of this application.

FIG. 4 is a schematic diagram of a speech recognition method according to an embodiment of this application. As shown in FIG. 4, the method includes steps 210 to 240, which are described in detail below.

210: Input a speech text of a user into a text encoding model to obtain a text feature code.

In this embodiment of this application, the speech text may be a word, a phrase, or a statement. The word, the phrase, or the statement herein may be in a Chinese form, an English form, or another language form.

Specifically, the speech text is input into the text encoding model, to obtain the text feature code of the speech text. The text encoding model may be, for example, a bidirectional encoder representation from transformers (BERT) model or a long-short term memory (LSTM) model.

The BERT model is used as an example for description. The BERT model may learn, by using a large quantity of text data, how to represent the speech text by using the feature code. When a new speech text is input into the BERT model, the BERT model may output a text feature code of the speech text, and the text feature code can represent semantics of the speech text.

The text feature code in this application may be a word vector. The word vector means a numerical vector mapped from the speech text, and the word vector may include all features and semantics from the speech text. The word vector represents the speech text, so that an electronic device can perform processing more conveniently, and a similarity between two texts may be more easily calculated. Usually, if word vectors of two texts are similar, the two texts also have similar semantics.

Optionally, the text feature code may alternatively be a context feature code. A feature item that can reflect a context of the speech text in the speech text is encoded by using the text encoding model, to obtain the context feature code.

In this application, the text encoding model may extract feature information of the speech text. A basic unit representing a text is usually referred to as a feature or a feature item of the text. The feature item usually needs to meet the following:

(1) The feature item is able to accurately identify text content.

(2) The feature item has a capability of distinguishing a target text from another text.

(3) A quantity of feature items cannot be too large.

(4) Feature item separation is relatively easy to implement. A character, a word, or a phrase may be used as the feature item representing the text.

It should be understood that the text feature code is a word vector obtained by mapping all speech texts, and the context feature code is a word vector obtained by mapping the feature item of the speech text.

Optionally, the speech text of the user and context information of the speech text are input into the text encoding model to obtain the text feature code.

It should be understood that the text feature code combines feature information of both the speech text and the context information. The text feature code can indicate the speech text and the context information.

In some embodiments, when the user performs human-computer interaction for the first time, the speech text of the user does not have the context information.

Optionally, before 210, the method further includes obtaining the speech text or a text of the user.

In this embodiment of this application, a human-computer interaction application may receive a speech or a text input by the user. If the speech of the user is received through speech interaction, the speech of the user is converted into text content by using a pre-processing module (for example, an ASR module). If the text of the user is received through text interaction, for example, the text is directly input through pinyin or handwriting, a conversion process is not required.

It should be understood that the speech text is the speech of the user that is converted into the text content, or the text input by the user.

There are a plurality of manners in which the human-computer interaction application receives the speech or the text input by the user.

For example, after detecting that the user taps an icon of the human-computer interaction application (for example, Voice Assistant) on a desktop of the electronic device, the electronic device starts the human-computer interaction application, and receives the speech or the text input by the user.

For example, after detecting that the user taps a specific physical button of the electronic device, the electronic device starts the human-computer interaction application, and receives the speech or the text input by the user.

For example, when detecting a wake-up word (for example, Xiaohua Xiaohua) of the user, the electronic device starts the human-computer interaction application, and receives the speech or the text input by the user.

For example, when detecting a non-wake-up word (for example, "turn on an air conditioner") that is set by the user or preset by a system, the electronic device uses the non-wake-up word as the speech or the text input by the user.

Specifically, after the electronic device detects the foregoing operation performed by the user, the human-computer interaction application at an application layer sends a label corresponding to the human-computer interaction application and a process name corresponding to the human-computer interaction application to a system service module at a framework layer. The system service module may determine, by using the label and the process name, hardware and software to be started, to receive the speech or the text input by the user.

Optionally, before 210, the context information of the speech text is obtained.

In this application, the electronic device may record a speech text of the user in each human-computer interaction process. When the user performs human-computer interaction again, the recorded speech text of the user is obtained as context information of a current speech text of the user.

220: Determine a multimodal selection vector based on a first context category to which the speech text belongs and a context-multimodal mapping matrix.

In 220, the first context category to which the speech text belongs is first determined.

Refer to FIG. 4. The text feature code of the speech text is input into a first classification layer, to determine the first context category to which the speech text belongs.

The classification layer may also be referred to as a classification function or a classifier. The first classification layer may automatically map the speech text to a context category according to a pre-specified standard and based on content or a feature of the speech text.

Optionally, the first classification layer may be a machine learning model. The first classification layer is trained by using a large quantity of speech text samples marked with context categories. After training is completed, when a new speech text is input, the speech text may be automatically mapped to a specific context.

The context category may be preset by a developer. In this application, a plurality of different context categories are preset for all possible speech texts, and text feature codes or context feature codes of speech texts belonging to a same context category are similar in semantics and numerical vectors.

For example, the context category may include: (1) a user experience category, for example, cold, hot, and noisy. For example, the speech text is "It is too hot", and the speech text belongs to a hotness context. (2) a single device category, for example, if the speech text is "air conditioner temperature", the speech text is related only to temperature adjustment of the air conditioner, and belongs to an air conditioner temperature adjustment context. For example, if the speech text is "seat ventilation", the speech text is related only to seat ventilation adjustment, and belongs to a seat ventilation adjustment context. (3) a non-modal category, if the speech text may not be classified into any context category, the speech text belongs to the non-modal category. For example, the context category of the speech text "How is the weather today" is the non-modal category.

The speech texts belonging to the same context category may have a plurality of different expression manners.

It should be understood that one context category may correspond to a plurality of speech texts. Each speech text belongs to only one context category. Different speech texts may belong to a same context category, or may belong to different context categories.

For example, feature information of the speech texts "It is too hot", "The temperature is too high today", or "I am almost melted" is similar, and the speech texts may be classified as the hotness context. For example, when the speech text is "It is too hot", the speech text belongs to the hotness context in the user experience category. When the speech text is "It is too noisy", the speech text belongs to the noise context in the user experience category.

In this embodiment of this application, a plurality of modalities may be further preset. In some embodiments, the electronic device may be a vehicle, and speech recognition in the vehicle is relatively more applied to modalities related to a vehicle status, a driving status, in-vehicle entertainment, an in-vehicle call, and the like. In some other embodiments, the electronic device may be a sound box, and speech recognition of the sound box is relatively more applied to modalities related to home appliance control, entertainment preference matching, an audio and video call, and the like.

In 220, the context-multimodal mapping matrix may be preset. In the context-multimodal mapping matrix, a mapping relationship between a plurality of preset context categories and a plurality of preset modalities is established, and each context category corresponds to one or more modalities. Optionally, each of a plurality of multimodal selection vectors represents a mapping relationship between each context category and each modality. Each multimodal selection vector is in a one-to-one correspondence with each context category. Each multimodal selection vector indicates one or more modalities.

For example, refer to the context-multimodal mapping matrix shown in Table 2. The context-multimodal mapping matrix includes four context categories, namely a hotness context, a coldness context, a noise context, a non-modal (no_multimodal) context, and nine modalities, namely an air conditioner temperature status (air_conditioner_temperature_state), an air conditioner air volume status (air_conditioner_wind_state), a seat heating status (seat_heater_temperature_state), a seat ventilation status (seat_heater_wind_state), a volume status (voice_volume_state), a window status (window_state), a vehicle speed status (car_move_state), an environment temperature status (outer_temperature_state), and an internal and external temperature difference status (temperature_difference_state). In the context-multimodal mapping matrix, a context-related modality is marked as "1" and a context-unrelated modality is marked as "0". For example, when the context category is the hotness context, modalities corresponding to the context category are the air conditioner temperature status, the seat heating status, the seat ventilation status, the window status, the environment temperature status, and the internal and external temperature difference status.

TABLE 2

| | Context category | | | |
|---|---|---|---|---|
| Modality | Hotness | Coldness | Noise | No_multimodal |
| Air_conditioner_temperature_state | 1 | 1 | 0 | 0 |
| Air_conditioner_wind_state | 0 | 0 | 1 | 0 |
| Seat_heater_temperature_state | 1 | 1 | 0 | 0 |
| Seat_heater_wind_state | 1 | 0 | 0 | 0 |
| Voice_volume_state | 0 | 0 | 1 | 0 |
| Window_state | 1 | 1 | 1 | 0 |
| Car_move_state | 0 | 0 | 1 | 0 |
| Outer_temperature_state | 1 | 1 | 0 | 0 |
| Temperature_difference_state | 1 | 1 | 0 | 0 |

It should be understood that the foregoing context-multimodal mapping matrix is merely used as an example, and should not constitute any limitation on this application.

Based on both the first context category to which the speech text belongs and the context-multimodal mapping matrix, the multimodal selection vector corresponding to the first context category or one or more modalities corresponding to the first context category may be determined.

For example, when the context category of the speech text is the hotness context, it may be determined, based on the context-multimodal mapping matrix, that the multimodal selection vector corresponding to the context category is (1, 0, 1, 1, 0, 1, 0, 1, 1). The multimodal selection vector indicates the following modalities: the air conditioner temperature status, the seat heating status, the seat ventilation status, the window status, the environment temperature status, and the internal and external temperature difference status. The multimodal selection vector may be understood as that a probability related to the air conditioner temperature status, the seat heating status, the seat ventilation status, the window status, the environment temperature status, or the internal or external temperature difference status is 1, and a probability related to the air conditioner air volume status, the volume status, or the vehicle speed status is 0.

Optionally, an identifier of the modality corresponding to the first context category may be determined based on both the first context category to which the speech text belongs and the context-multimodal mapping matrix.

Optionally, before 220, modal information of each preset modality is obtained, and a mapping relationship between a plurality of context categories and modal information of each preset modality is established in the context-multimodal mapping matrix.

It should be understood that the modal information includes modal data or a modal feature code obtained through encoding processing on the modal data.

The modal data may be understood as original data of the modality, for example, a modality (for example, cooling or heating) of an air conditioner, a temperature (25° C.) set by the air conditioner, or a vehicle traveling speed (40 km/h). The modal feature code is a modal feature code obtained through encoding processing.

In this case, modal information that matches the speech text may be determined based on both the first context category to which the speech text belongs and the context-multimodal mapping matrix.

Optionally, in addition to selecting the modality in the manner shown in 220, the preset modality may be further matched with the feature code of the speech text, and a modality with a high matching degree or a high similarity is selected as the modality that matches the speech text. Then, the multimodal selection vector is determined.

230: Obtain modal information that matches the speech text.

In 220, based on both the first context category to which the speech text belongs and the context-multimodal mapping matrix, the multimodal selection vector is obtained or the modality that matches the speech text is selected.

In 230, the modal information that matches the speech text is obtained based on the multimodal selection vector.

In a possible implementation, before 230, the electronic device obtains modal data of each preset modality, and performs encoding processing on the modal data, to obtain a modal feature code of each preset modality. Then, a modal feature code of a modality indicated by the multimodal selection vector is obtained.

A multimodal feature code is formed by fusing a plurality of modal feature codes indicated by the multimodal selection vector that match the speech text. A manner of fusing the modal feature codes may be adding or concatenating the plurality of modal feature codes.

For example, before 230, the electronic device obtains modal data such as user profile (UP) data, context awareness (CA) data, and mobile phone status data, and performs encoding processing on the modal data, to obtain modal feature codes such as a UP feature code, a CA feature code, and a mobile phone status feature code respectively. The multimodal selection vector indicates that the modality that matches the speech text of the user is a user profile modality and a context awareness modality. Then, the UP data and the CA data may be obtained, or the UP modal feature code and the CA modal feature code may be obtained as the modal information that matches the speech text. The mobile phone status data or the mobile phone status feature code is not modal information that matches the speech text.

Optionally, the fusing the plurality of modal feature codes that match the speech text may alternatively be performed in feature fusion in 240.

It should be understood that the multimodal feature code may be a representation form of the modal information.

The modal data of the preset modality may be obtained in a plurality of manners. For example, in a vehicle traveling scenario, the electronic device may be a vehicle, and may obtain environment information around the vehicle by using a radar, and may obtain environment temperature data by using a temperature sensor. For example, in a daily life scenario, the electronic device may be a mobile phone, and may obtain location information by using a GPS of the mobile phone, obtain a temperature of the mobile phone by using a temperature sensor, obtain a battery level of the mobile phone, or obtain that the user browses a web page or plays a game (obtain information related to the game) before human-computer interaction. For example, when obtaining the context awareness data, the electronic device can "perceive" a current scenario by using a sensor and a related technology of the sensor, for example, a motion scenario, a walking scenario, a home scenario.

It should be understood that the modal data may change at different moments. For example, a seat heating level may be adjusted. Modal data during human-computer interaction may reflect a context of a current human-computer dialogue.

Optionally, the modal data of each preset modality is periodically obtained, and encoding processing is performed on the modal data, to obtain modal feature codes.

Optionally, the electronic device stores and updates the modal data or the modal feature code of each preset modality in real time.

In this way, the electronic device may obtain the modal information of each preset modality in advance. In a human-computer interaction process, time spent in obtaining the modal information that matches the speech text can be reduced, improving human-computer interaction efficiency and user experience.

Optionally, the modal data of each preset modality is obtained, and encoding processing is performed on the modal data of the modality indicated by the multimodal selection vector, to obtain the modal feature code.

In another possible implementation, the electronic device may obtain only the modal data of the modality indicated by the multimodal selection vector, and then perform encoding processing on the modal data to obtain the modal feature code. In this case, the modal feature code is the modal feature code that matches the speech text.

In this way, the electronic device may obtain the modal information that matches the speech text, but does not obtain modal information that does not match the speech text, so that power consumption or resource consumption of human-computer interaction can be reduced.

The following describes a process of performing encoding processing on the modal data.

In this application, different encoding manners may be selected based on a type of the modal data. For example, multilayer perceptron (MLP) encoding is selected for modal data of a user profile type, and convolutional neural network (CNN) encoding is selected for modal data of an image type.

The modal data of the user profile type is used as an example for description.

The modal data of the user profile type may be a behavior feature of the user, a natural attribute of the user, or the like. For example, the behavior feature of the user may be preference for watching a movie, preference for listening to music, or a habit of traveling with a window closed. For example, the natural attribute of the user may be a name, a gender, an age, a constellation, a height, an occupation, an education degree, or the like. The multilayer perceptron is also called a deep neural network (DNN), and can combine features of data samples used for human-computer interaction, to form a more abstract high-level attribute or feature. These features are also presented in a form of vector data.

When semantic understanding is performed on the speech text with reference to modal information of the user profile type, an intention expressed by the speech text of the user can be more accurately expressed, meeting a requirement of the user.

240: Perform multimodal semantic understanding with reference to the multimodal feature code and the text feature code, to output an intention and a slot.

Feature fusion is performed on the multimodal feature code and the text feature code, and then a fused feature code is input to a second classification layer, to output the intention and the slot.

The second classification layer may automatically map the speech text to a specific intention according to a pre-specified standard and based on content or features of both the speech text and the modal information that matches the speech text. It should be understood that the slot output in 240 may be filled with slot information, or may be not filled with slot information. When the speech text includes the slot-related information, multimodal semantic understanding may recognize the slot-related information and fill the slot.

A plurality of intentions may be preset in this application, for example, in a vehicle traveling scenario, in-vehicle entertainment system control, such as music and volume; navigation control; driving assistance function control, such as air conditioner adjustment, skylight adjustment, and seat adjustment; and telephone communication control, such as making a call, sending an SMS message, reading an SMS message, and reading a WeChat message.

In addition, each intention corresponds to a plurality of slots, and the plurality of slots corresponding to each intention may be predefined. For example, the speech text of the user is "Navigate to a nearest gas station", the intention of the user is "navigation control", and slots corresponding to the intention are "starting place" and "destination". The default slot "starting place" may be a current location, and the slot "destination" is "a nearest gas station". An address of "a nearest gas station" may be obtained by searching, and the slot is filled.

The second classification layer may perform multimodal semantic understanding with reference to the speech text and the modal information that matches the speech text, to determine a specific intention in the plurality of preset intentions to which the intention indicated by the speech text belongs.

In this embodiment of this application, when multimodal semantic understanding is performed on the speech text with reference to different modal information, output intentions and slots may be different.

For example, refer to Table 3. When the speech text of the user is "It is too hot", semantics of the user is to express that the user feels very hot, but the intention of the user may be to disable seat heating, turn on an air conditioner for cooling, or enable seat ventilation. In a conventional human-computer interaction application, multimodal information that matches the speech text cannot be obtained. As a result, the intention of the user may be incorrectly recognized, or the intention of the user needs to be determined through a plurality of rounds of human-computer interaction. Therefore, human-computer interaction efficiency is relatively low. If the multimodal information that matches the speech text is combined, for example, the air conditioner is not turned on, an environment temperature is 33° C., the seat ventilation is enabled, and a window is closed, it may be identified that the intention of the user is to turn on the air conditioner for cooling.

In some scenarios, the modal information that matches the speech text is: the seat heating is enabled; a seat heating level is 3; and an environment temperature is 10° C. In this case, it may be identified that the intention of the user is to disable the seat heating or turn down the seat heating level.

TABLE 3

| Speech text | Modal information | Intention |
|---|---|---|
| It is too hot | Environment status: traveling at a temperature of 33° C.<br>Device status: An air conditioner is not turned on | Enabling an air conditioner cooling mode |
| | Environment status: traveling at a temperature of 10° C.<br>Device status: Seat heating is enabled | Disabling a seat heating mode |

Certainly, Table 3 does not display all multimodal information that matches the speech text. For example, the multimodal information may further include a vehicle window opening status, an internal and external temperature difference, an environment temperature, a seat ventilation status, and the like.

For example, refer to Table 4. The speech text of the user is "Play "Ambush from Ten Sides"". When a user habit in the modal information is preference for a song, music "Ambush from Ten Sides" is played. When a user habit in the modal information is preference for movie and television, a video "Ambush from Ten Sides" is played.

TABLE 4

| Speech text | Modal information | Intention |
|---|---|---|
| Play "Ambush from Ten Sides" | Environment status: traveling, driver<br>User profile: preference for a song | Play music "Ambush from Ten Sides" |
| | Environment status: traveling, driver<br>User profile: preference for movie and television | Play a video "Ambush from Ten Sides" |

If it is recognized that the speech text "Play "Ambush from Ten Sides"" is input by a front passenger, the modal information that matches the speech text may not include information related to a user profile modality. In this case, the intention of the user may be determined in a query manner.

In some scenarios, if the intention of the user is not recognized and the slot is not filled with reference to the multimodal information that matches the speech text, an intention recognition error and a query error may be caused. For example, if a user expression is "It is too hot", air conditioner cooling is in an enabled state, but a cooling temperature of the air conditioner is 30° C. A conventional voice assistant does not obtain multimodal information that matches the speech text, and may recognize that the intention of the user is to turn on the air conditioner for cooling, and then ask the user whether to turn on the air conditioner for cooling. In this case, an invalid human-computer dialogue is generated.

Figure 5:
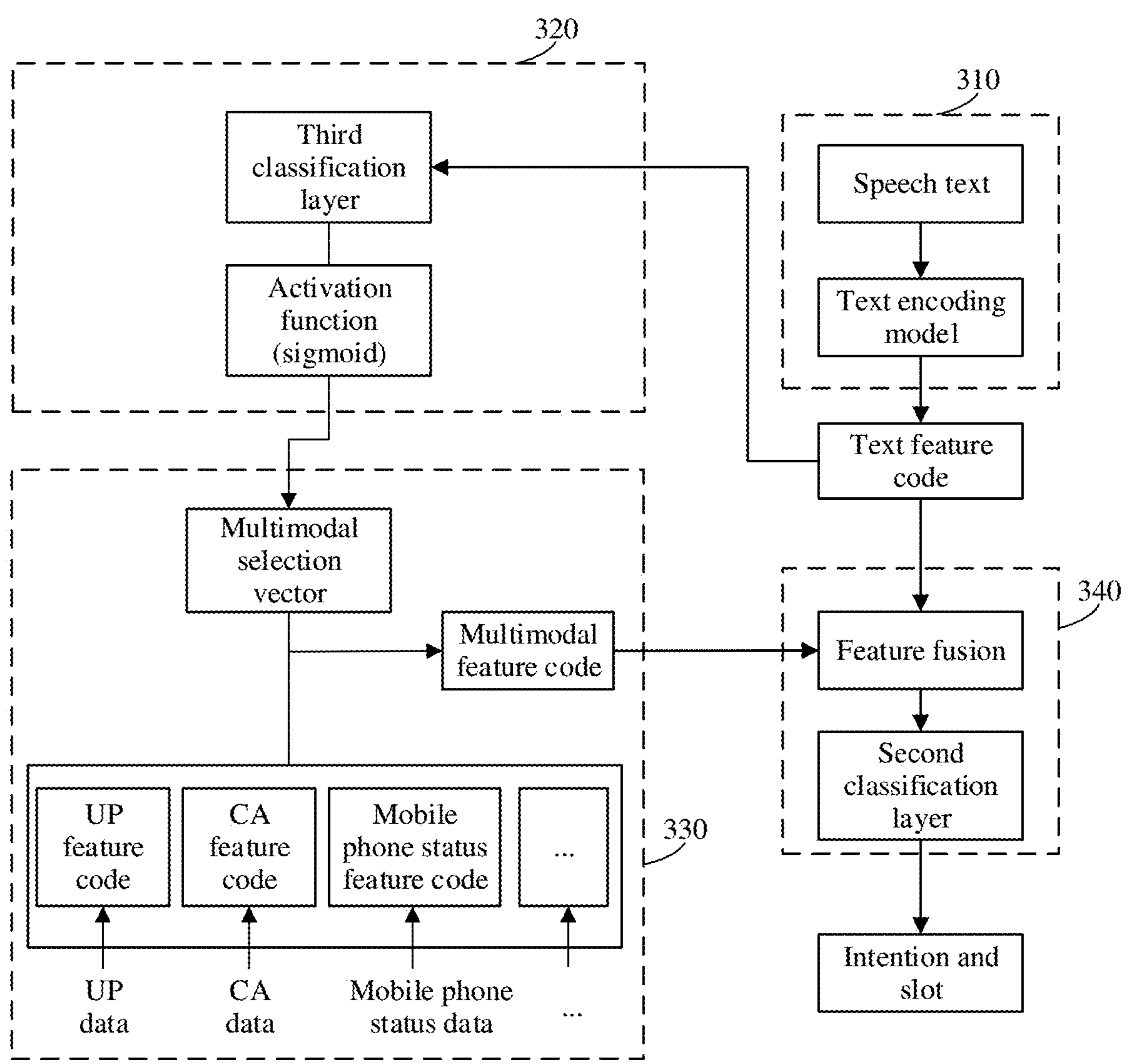
FIG. 5 is a schematic diagram of another speech recognition method according to an embodiment of this application.

FIG. 5 is a schematic diagram of another speech recognition method according to an embodiment of this application. The embodiment shown in FIG. 5 includes steps 310 to 340. Details are described below.

310: Input a speech text of a user into a text encoding model to obtain a text feature code.

Step 310 is the same as step 210 in FIG. 4. For details, refer to related descriptions of step 210.

Optionally, the speech text of the user and context information of the speech text are input into the text encoding model to obtain the text feature code.

It should be understood that the text feature code combines feature information of both the speech text and the context information. The text feature code can indicate the speech text and the context information.

It should be further understood that the text feature code or a context feature code is a processed speech text, and belongs to a representation form of the speech text.

320: Obtain a multimodal selection vector based on the text feature code and a third classification layer.

Specifically, the third classification layer may be first trained by using a large quantity of training sample data sets, and the third classification layer that is finally trained may predict correlation between a newly input speech text and each preset modality. Then, a probability of relevance between the speech text and each preset modality are calculated by using an activation function sigmoid, to obtain the multimodal selection vector. The multimodal selection vector indicates the probability of relevance between the speech text and each preset modality.

The training sample data set may be a large quantity of text feature codes labeled with a plurality of modal labels. For example, a text feature code of the speech text "It is too noisy" corresponds to a plurality of modal labels such as a window status and a volume status. A text feature code of the speech text "What's the noise outside" corresponds to a plurality of modal labels such as a window status and a traveling speed. The third classification layer is trained, by using a large quantity of similar training sample data, to learn a capability of predicting a modal label corresponding to the speech text.

A definition field of the activation function sigmoid can take a real number within any range or a preset range, and return an output value within a range from 0 to 1. In this embodiment of this application, the output value indicates the probability of relevance between the speech text and each preset modality. For example, the multimodal selection vector is (0.98, 0.02, 0.99), and a vector of the preset modality is represented as (a modality a, a modality b, a modality c). In this case, the multimodal selection vector indicates that in a context category, a probability related to the modality a is 0.98, a probability related to the modality b is 0.02, and a probability related to the modality c is 0.99.

It should be understood that, when the text feature code is obtained with reference to the speech text and the context information, the text feature code includes features of the speech text and the context information. The multimodal selection vector indicates a probability of relevance between the speech text and the context information and each preset modality.

Optionally, the third classification layer may include the text encoding model. In this way, the third classification layer may be trained by using a large quantity of speech texts that are labeled with the plurality of modal labels. Therefore, when a new speech text is input, a modality related to the speech text may be predicted, to obtain modal information that matches the speech text.

Optionally, the third classification layer may include the activation function sigmoid. When a new speech text is input, a multimodal selection vector may be directly output. The multimodal selection vector indicates the probability of relevance between each of a plurality of preset modalities and the speech text.

330: Obtain the modal information that matches the speech text.

330 is the same as 230 in FIG. 4. For details, refer to related descriptions of 230.

It should be understood that, when the text feature code is obtained with reference to the speech text and the context information, the modal information that matches the speech text may be modal information that matches the speech text and the context information.

Optionally, the modal information that matches the speech text is obtained by multiplying the multimodal selection vector and a vector for storing modal information.

For example, the multimodal selection vector corresponding to the speech text is (0.98, 0.02, 0.99), and a modal feature code of each modality is stored by using a vector of (a modal feature code a, a modal feature code b, and a modal feature code c), and (0.98× the modal feature code a, 0.02× the modal feature code b, and 0.99× the modal feature code c) may be obtained through matrix multiplication. Then, these modal feature codes are fused, and a multimodal feature code that matches the speech text may be obtained.

Optionally, the multimodal selection vector may be represented as a vector including only "0" or "1". When a probability of relevance between the speech text and the preset modality is greater than a preset threshold, the speech text is related to the preset modality, that is, an element corresponding to the preset modality in the multimodal selection vector is "1". When a probability of relevance between the speech text and the preset modality is less than a preset threshold, the speech text is not related to the preset modality, that is, an element corresponding to the preset modality in the multimodal selection vector is "0".

440: Perform multimodal semantic understanding with reference to the multimodal feature code and the text feature code.

440 is the same as 340 in FIG. 3. For details, refer to related descriptions of 340.

FIG. 6 is a schematic flowchart of another speech recognition method according to an embodiment of this application. As shown in FIG. 6, a method 400 includes step S410 to step S440. The following describes each step in detail.

S410: Determine, based on a speech text of a user and context information, a first context category to which the speech text belongs.

Specifically, the speech text and the context information are combined and input into a text encoding model, for example, a BERT model or an LSTM model, and text encoding is performed on the speech text and the context information to obtain a text feature code. Then, the text feature code is input to a first classification layer, to determine the first context category to which the speech text belongs.

Optionally, feature information of both the speech text and the context information is extracted, and the feature information is encoded to obtain a text context feature code.

Optionally, the first context category to which the speech text belongs is determined based on the speech text of the user.

When the context category to which the first speech text belongs is determined with reference to the context information, it helps determine the real context category of the speech text. In this way, correct modal information is selected to perform multimodal semantic understanding, and an intention indicated by the speech text is determined. Therefore, a semantic recognition error is reduced, and human-computer interaction frequency is reduced, improving human-computer interaction efficiency and user experience.

When the speech text cannot clearly indicate the current context category, but the context information may indicate the current context category, it helps determine the context category of the speech text. In this way, correct modal information is selected to perform multimodal semantic understanding, and the intention indicated by the speech text is determined. Therefore, a semantic recognition error is reduced, and human-computer interaction frequency is reduced, improving human-computer interaction efficiency and user experience.

For example, a human-computer interaction process is as follows:

User: "Tell a cold joke."

BOT: "I have never played simple mode since I had choice difficulty."

User: "It is very cold."

In this case, if the text feature code is determined only based on the speech text "It is very cold", the speech text belongs to a "cold" context category. However, if the text feature code is determined based on "Tell a cold joke" and "It is very cold" that are input by the user, it may be recognized that "It is very cold" does not indicate that a body temperature feeling of the user is very cold, but that the joke is very cold. Therefore, the foregoing speech text "It is very cold" should belong to a non-modal context category.

For example, a human-computer interaction process is as follows:

User: "What is the temperature of an air conditioner?"

BOT: "The current temperature of the air conditioner is 16° C."

User: "It is a little cold."

In this case, if the text feature code is determined only based on the speech text "It is a little cold", the speech text belongs to a "cold" context category. However, if the text feature code is determined based on "What is the temperature of the air conditioner" and "It is a little cold" that are input by the user, it may be recognized that "It is a little cold" does not indicate that weather is very cold, but indicates that the temperature of the air conditioner is a little low. Therefore, the foregoing speech text "It is a little cold" should belong to a context category related to the temperature of the air conditioner in a single device category. When the speech text belongs to different context categories, a modality that matches the speech text may be different, and when multimodal semantic understanding is performed, a recognized intention may be greatly different.

In some scenarios, the speech text cannot clearly indicate the current context category, and the context information includes a feature reflecting the context category. For example:

User: "What is the seat heating level?"

BOT: "The seat heating level is 3."

User: "Turn down the level."

In this case, the speech text cannot clearly indicate the current context category, but the context information may indicate that the context category of the speech text is a seat heating adjustment context in the single device category.

S420: Obtain, based on the first context category to which the speech text belongs and a first mapping matrix, modal information that matches the speech text.

In some embodiments, a plurality of context categories and a plurality of multimodal selection vectors are preset in the first mapping matrix. Each multimodal selection vector is in a one-to-one correspondence with each context category. Each multimodal selection vector indicates one or more modalities. A multimodal selection vector corresponding to the first context category is determined from the first mapping matrix, based on both the first context category to which the speech text belongs and the first mapping matrix. In this way, modal information of a modality indicated by the multimodal selection vector is obtained.

Optionally, before step 420, modal information of each preset modality in the first mapping matrix is obtained.

It should be understood that the modal information may be modal data, or may be a modal feature code obtained by performing encoding processing on the modal data.

It should be further understood that when the obtained modal information is the modal data, encoding processing needs to be performed on each piece of modal data, to determine a modal feature code of each piece of modal data. When the obtained modal information is the modal feature code, an encoding step may be selectively skipped.

In this embodiment of this application, when the context category to which the speech text belongs is determined with reference to different context information, the context category to which the speech text belongs may be different.

In some scenarios, the context category can be more accurately determined with reference to the speech text and a dialog context, so that correct multimodal information may be obtained.

For example, a human-computer interaction process is as follows:

User Q1: "I just came back from playing basketball."

BOT: " . . . "

User Q2: "It is very hot."

If only based on the current speech text "It is very hot", a context is classified as a hotness context, and modal information such as an environment temperature status, an internal and external temperature difference status, an air conditioner temperature status, and a window status is selected.

If based on the current speech text "It is very hot" and the dialog context information "I just came back from playing basketball", a context is classified as a hotness context generated by motion, and is unrelated to some modalities (for example, a seat heating status), and only modal information such as a window status, an air conditioner temperature status, and an environment temperature status is selected.

For example, a human-computer interaction process is as follows:

User Q1: "What happened outside the vehicle?"

BOT: " . . . "

User Q2: "It is so noisy."

If only based on the current speech text "It is so noisy", a context is classified as a noise context, and modal information such as an air conditioner air volume status, a window status, and a volume status is selected.

If based on the current speech text "It is so noisy" and the dialogue context information "What happened outside", a context is classified as a noise context outside the vehicle and the context is unrelated to a modality (for example, an air conditioning air volume status) inside the vehicle.

In some other embodiments, the modal information of the modality related to the speech text may also be obtained without a need to classify the context category of the speech text.

For example, a third classification layer is trained, by using a large quantity of sample data sets, to learn a mapping relationship between the speech text or the text feature code of the speech text and each preset modality. When a new speech text is obtained, a modality related to the speech text can be predicted, to obtain modal information that matches the speech text. The speech text herein may include the context information.

S430: Perform multimodal semantic understanding with reference to the speech text, the context information, and the modal information that matches the speech text, to output an intention and a slot.

Specifically, the multimodal semantic understanding is performed based on the speech text, the context information, and the modal information that matches the speech text, to output the intention and the slot.

In some scenarios, the user expresses the intention of the user through a plurality of rounds of speech interaction. A computer cannot accurately recognize the intention of the user only based on the current speech text and the multimodal information. Intention-related information can be supplemented based on the dialog context information.

For example, a human-computer interaction process is as follows:

User: "How is the weather in Beijing?"

BOT: "The weather in Beijing has been broadcast for you."

User: "What is there to eat?"

In the human-computer interaction process, the user first queries about the weather in Beijing, and then queries about "What is there to eat". Herein, "there" means Beijing, and an intention indicated by the speech text is "query food in Beijing". In this case, it may be possible to search for the food in Beijing for the user, and broadcast the food to the user.

Optionally, in step 340, the multimodal semantic understanding may also be performed with reference to the speech text and the modal information that matches the speech text, to output the intention and the slot.

FIG. 7 is a schematic flowchart of another speech recognition method according to an embodiment of this application. As shown in FIG. 7, a method 500 includes step S510 to step S530. The following describes each step in detail.

S510: Obtain a first speech text.

It should be understood that the first speech text may be a speech text obtained by recognizing a speech of a user, or may be a text obtained by receiving a text input by the user. The first speech text may be, for example, the speech text shown in 210 in FIG. 4.

S520: Obtain, based on the first speech text, first modal information that matches the first speech text, where a modality indicated by the first modal information is a first modality in a plurality of preset modalities.

For example, the preset modality may be all nine modalities in the context-multimodal mapping matrix shown in Table 2. For example, when the speech text is "It is too cold", the first modality may be a modality corresponding to a coldness context in the context-multimodal mapping matrix shown in Table 2: an air conditioner temperature status, a seat heating status, a seat ventilation status, a window status, an environment temperature status, and an internal or external temperature difference status. The first modal information may be modal information corresponding to the first modality.

It should be understood that the first modal information is modal information of one or more of the plurality of preset modalities.

It should be further understood that the modal information may have a plurality of representation forms. In some embodiments, the modal information may be modal data. For example, modal data of the environment temperature status is 30° C. In some other embodiments, the modal information may also be a modal feature code corresponding to the modal information, that is, encoding processing is performed on the modal data, and the modal data is converted into the modal feature code that may be processed by an electronic device. The modal information may also be presented in a form of a multimodal feature code, that is, the multimodal feature code is formed by fusing modal feature codes of a plurality of pieces of modal information.

In this embodiment of this application, different modalities may be preset in different scenarios. For example, in a vehicle traveling scenario, modalities related to a vehicle status, a driving status, in-vehicle entertainment, an in-vehicle call, and the like may be preset. For example, in a home scenario, modalities related to home appliance control, entertainment preference matching, an audio and video call, and the like may be preset.

Optionally, each preset modality is matched with the first speech text, and a modality with a high matching degree or a high similarity is selected as a modality that matches the first speech text.

In some embodiments, a multimodal selection vector is obtained based on the first speech text, where the multimodal selection vector indicates a probability of relevance between the first speech text and each of the plurality of preset modalities. The first modal information is obtained based on the multimodal selection vector.

The multimodal selection vector indicates the probability of relevance between the first speech text and each of the plurality of preset modalities. For example, it is assumed that three modalities are preset and are represented as (a modality a, a modality b, a modality c) by using a vector. The first speech text may be related to or may not be related to each preset modality. When the first speech text is related to the modality a, and is not related to the modality b and the modality c, the multimodal selection vector is (1, 0, 0), for example, the multimodal selection vector in the embodiment shown in FIG. 4.

For another example, it is assumed that three modalities are preset and are represented as (a modality a, a modality b, a modality c) by using a vector. It is assumed that a probability related to the modality a is 0.98, a probability related to the modality b is 0.02, and a probability related to the modality c is 0.99. In this case, the multimodal selection vector is (0.98, 0.02, 0.99), for example, the multimodal selection vector in the embodiment shown in FIG. 5.

In some embodiments, a first context category to which the first speech text belongs is determined. The multimodal selection vector is obtained based on the first context category, where the multimodal selection vector indicates a probability of relevance between the first context category and each of the plurality of preset modalities.

In this application, a plurality of different context categories may be preset, and texts belonging to a same context category have similar features. When which context category to which the first speech text belongs is determined, the first speech text may be matched with the plurality of preset context categories, to determine the first context category to which the first speech text belongs. Then, a modality that matches the first context category is obtained based on a matching degree between the first context category and the plurality of preset modalities, and therefore modal information that matches the first context category is obtained.

In some embodiments, the multimodal selection vector is obtained based on the first context category and a first mapping matrix. The first mapping matrix indicates a plurality of context categories and a plurality of multimodal selection vectors. Each multimodal selection vector indicates one or more modalities. The plurality of context categories are in a one-to-one correspondence with the plurality of multimodal selection vectors.

For example, the first mapping matrix may be the context-multimodal mapping matrix shown in Table 2.

It should be understood that a mapping relationship between a plurality of preset context categories and a plurality of multimodal selection vectors may be established in the first mapping matrix. Each preset context category corresponds to a multimodal selection vector. Each multimodal selection vector may indicate one or more modalities. In this way, a mapping relationship between the context category and the modality may be established.

The context category to which the first speech text belongs is first determined, and then the modality that matches the first speech text may be determined based on the mapping relationship between the context category and the preset modality, to obtain the modal information that matches the first text.

In some embodiments, modal information of the plurality of preset modalities is obtained.

For example, environment temperature data is obtained by using a temperature sensor.

In some embodiments, the first modal information is obtained based on the multimodal selection vector and the modal information of the plurality of preset modalities.

For example, matrix multiplication may be performed on the multimodal selection vector and the modal information of the plurality of preset modalities.

In some embodiments, the first context category to which the first speech text belongs is determined based on the first speech text and/or context information of the first speech text.

In some embodiments, a text feature code of the first speech text and/or the context information of the first speech text is obtained. The first context category to which the first speech text belongs is determined based on the text feature code and a first classification layer, where the first classification layer is used to map the first speech text to a context category of the plurality of preset context categories.

For example, the text feature code may be the text feature code output in 210 in FIG. 4 and in 310 in FIG. 5. The first classification layer may be the first classification layer shown in 220 in FIG. 4. The plurality of preset context categories may be the context categories in the context-multimodal mapping matrix shown in Table 2.

In some embodiments, the electronic device may perform an operation related to a first intention.

For example, when the first intention is "book an air ticket", the operation related to the first intention may be that a command execution module performs the operation of booking the air ticket. You may also query the user for more slot information related to "book an air ticket".

In some embodiments, the multimodal selection vector is obtained based on the first speech text and a third classification layer, where the third classification layer is used to determine the probability of relevance between the first speech text and each of the plurality of preset modalities.

For example, the third classification layer may be the third classification layer in 320 in FIG. 5. The multimodal selection vector may be the multimodal selection vector in FIG. 5.

It should be understood that the third classification layer may include a text encoding model or an activation function sigmoid.

In some embodiments, a second speech text is obtained, where content of the second speech text is the same as content of the first speech text. Second modal information that matches the second speech text is obtained, where a modality indicated by the second modal information is a second modality in the plurality of preset modalities, and the second modality is different from the first modality. A second intention and a second slot that are indicated by the second speech text when the second speech text matches the second modal information, are determined based on the second speech text and the second modal information, where the second intention is different from the first intention, and/or the second slot is different from a first slot.

For example, the second speech text and the first speech text may be "It is too hot" in Table 3. The first modal information may be "environment status: traveling with a temperature of 33° C.; device status: air conditioner is not turned on" in Table 3. The second modal information may be "environment status: traveling with a temperature of 10° C.; device status: seat heating is enabled" in Table 3. The first intention may be "enabling an air conditioner cooling mode" in Table 3. The second intention may be "disabling a seat heating mode" in Table 3. The first slot and the second slot are respectively slots corresponding to "enabling an air conditioner cooling mode" and "disabling a seat heating mode". For example, the slot for "enabling an air conditioner cooling mode" may be "air conditioner temperature=20° C." and "air conditioner air volume=level 3".

S530: Determine, based on the first speech text and the first modal information, the first intention and the first slot that are indicated by the first speech text when the first speech text matches the first modal information.

It should be understood that in this embodiment of this application, a plurality of different intentions may be preset, and each intention corresponds to a different slot. After the intention is determined, the slot is also determined. For example, the first intention and the first slot may be the intention and the slot in the example of "book an air ticket", or may be the intention corresponding to the speech text shown in Table 4.

In some embodiments, the first modal information includes a first modal feature code. The first intention and the first slot that are indicated by the first speech text in the first modality are determined based on the text feature code, the first modal feature code, and a second classification layer, where the second classification layer is used to map the first speech text to one of a plurality of preset intentions.

For example, the first modal feature code may be the multimodal feature code in FIG. 4 or FIG. 5. The second classification layer may be the second classification layer in FIG. 4 or FIG. 5.

The foregoing describes method embodiments of embodiments of this application in detail with reference to FIG. 1 to FIG. 7. The following describes an apparatus embodiment of embodiments of this application in detail with reference to FIG. 8. It should be understood that the descriptions of the method embodiment correspond to descriptions of the apparatus embodiment. Therefore, for a part that is not described in detail, refer to the foregoing method embodiment.

Optionally, a speech recognition apparatus provided in this application may be an electronic device.

It can be understood that, to implement the foregoing functions, the electronic device includes corresponding hardware and/or software modules for performing each function. With reference to algorithm steps of the examples described in embodiments disclosed in this specification, this application can be implemented in a form of hardware or a combination of hardware and computer software. Whether a function is performed by hardware or hardware driven by computer software depends on a particular application and a design constraint of the technical solutions. A person skilled in the art may use different methods to implement the described functions for each particular application with reference to embodiments, but it should not be considered that the implementation goes beyond the scope of this application.

In this embodiment, the electronic device may be divided into functional modules based on the foregoing method examples. For example, each functional module may be obtained through division based on each corresponding function, or two or more functions may be integrated into one processing module. The integrated module may be implemented in a form of hardware. It should be noted that, division into the modules in embodiments is an example and is merely logical function division, and may be other division in an actual implementation.

Figure 8:
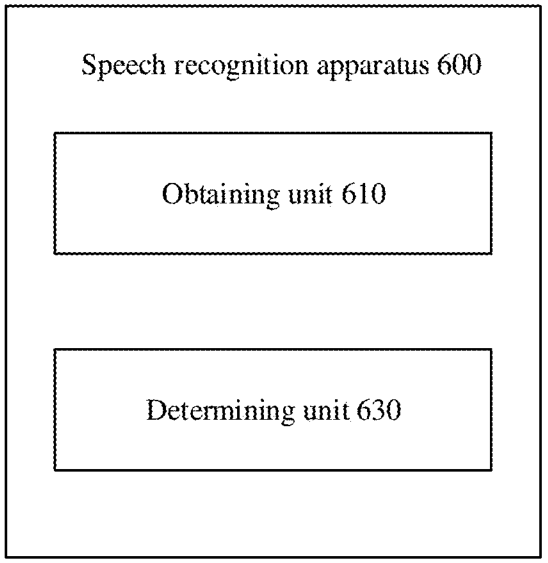
FIG. 8 is a schematic block diagram of a speech recognition apparatus according to an embodiment of this application.

When each function module is obtained through division based on each corresponding function, FIG. 8 is a possible schematic diagram of a composition of a speech recognition apparatus 600 in the foregoing embodiment. As shown in FIG. 8, the speech recognition apparatus 600 may include an obtaining unit 610 and a processing unit 620. The obtaining unit 610 is configured to obtain a first speech text.

The processing unit 620 is configured to: obtain, based on the first speech text, first modal information that matches the first speech text, where a modality indicated by the first modal information is a first modality in a plurality of preset modalities; and determine, based on the first speech text and the first modal information, a first intention and a first slot that are indicated by the first speech text when the first speech text matches the first modal information.

The speech recognition apparatus 600 provided in this embodiment of this application may perform multimodal semantic understanding with reference to the first speech text and the modal information that matches the first speech text. Therefore, the intention indicated by the first speech text is determined accurately, improving human-computer interaction efficiency and user experience.

Optionally, the processing unit 620 is specifically configured to: obtain a multimodal selection vector based on the first speech text, where the multimodal selection vector indicates a probability of relevance between the first speech text and each of the plurality of preset modalities; and obtain the first modal information based on the multimodal selection vector.

Optionally, the processing unit 620 is specifically configured to: determine a first context category to which the first speech text belongs; and obtain the multimodal selection vector based on the first context category, where the multimodal selection vector indicates a probability of relevance between the first context category and each of the plurality of preset modalities.

Optionally, the processing unit 620 is specifically configured to obtain the multimodal selection vector based on the first context category and a first mapping matrix, where the first mapping matrix indicates a plurality of context categories and a plurality of multimodal selection vectors, each multimodal selection vector indicates one or more modalities, and the plurality of context categories are in a one-to-one correspondence with the plurality of multimodal selection vectors.

Optionally, the processing unit 620 is further configured to obtain modal information of the plurality of preset modalities.

Optionally, the processing unit 620 is further configured to obtain the first modal information based on the multimodal selection vector and the modal information of the plurality of preset modalities.

Optionally, the processing unit 620 is specifically configured to determine, based on the first speech text and/or context information of the first speech text, the first context category to which the first speech text belongs.

Optionally, the processing unit 620 is specifically configured to: obtain a text feature code of the first speech text and/or the context information of the first speech text; and determine, based on the text feature code and a first classification layer, the first context category to which the first speech text belongs, where the first classification layer is used to map the first speech text to one of a plurality of preset context categories.

Optionally, the first modal information includes a first modal feature code. The processing unit 620 is specifically configured to determine, based on the text feature code, the first modal feature code, and a second classification layer, the first intention and the first slot that are indicated by the first speech text in the first modality, where the second classification layer is used to map the first speech text to one of a plurality of preset intentions.

Optionally, the processing unit 620 is further configured to perform an operation related to the first intention.

Optionally, the processing unit 620 is specifically configured to obtain the multimodal selection vector based on the first speech text and a third classification layer, where the third classification layer is used to determine the probability of relevance between the first speech text and each of the plurality of preset modalities.

Optionally, the processing unit 620 is specifically configured to: obtain a second speech text, where content of the second speech text is the same as content of the first speech text; and obtain second modal information that matches the second speech text, where a modality indicated by the second modal information is a second modality in the plurality of preset modalities, and the second modality is different from the first modality; determine, based on the second speech text and the second modal information, a second intention and a second slot that are indicated by the second speech text when the second speech text matches the second modal information, where the second intention is different from the first intention, and/or the second slot is different from the first slot.

Figure 9:
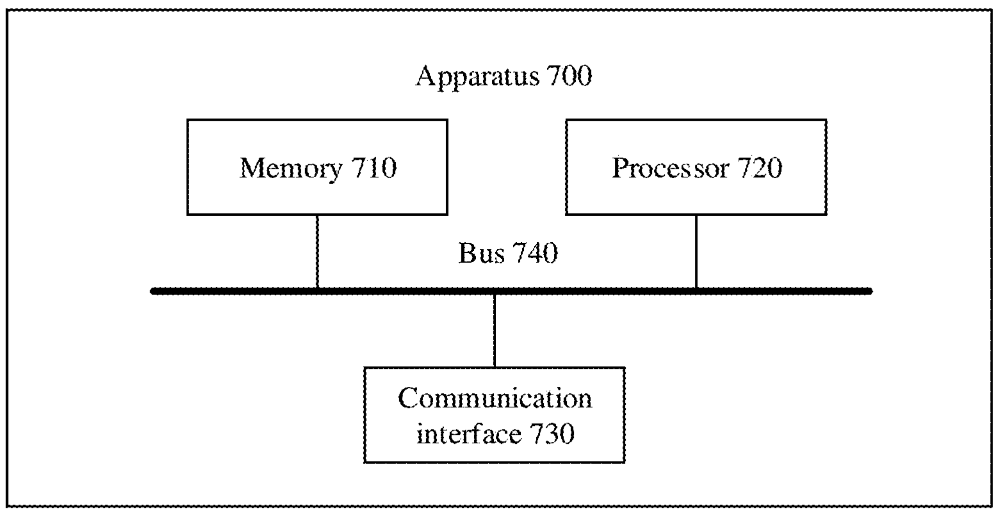
FIG. 9 is a schematic diagram of a hardware structure of a speech recognition apparatus according to an embodiment of this application.

FIG. 9 is a schematic diagram of a hardware structure of a speech recognition apparatus according to an embodiment of this application. A speech recognition apparatus 700 (the apparatus 700 may be specifically an electronic device) shown in FIG. 9 includes a memory 710, a processor 720, a communication interface 730, and a bus 740. The memory 710, the processor 720, and the communication interface 730 implement communication connection with each other through the bus 740.

The memory 710 may be a ROM, a static storage device, a dynamic storage device, or a RAM. The memory 710 may store a program. When the program stored in the memory 710 is executed by the processor 720, the processor 720 is configured to perform the steps of the speech recognition method in embodiments of this application.

The processor 720 may be a general-purpose CPU, a microprocessor, an ASIC, a GPU, or one or more integrated circuits, and is configured to execute a related program, to implement a function that needs to be performed by a unit in the speech recognition apparatus in this embodiment of this application, or perform the speech recognition method in the method embodiments of this application.

The processor 720 may alternatively be an integrated circuit chip and has a signal processing capability. In an implementation process, the steps of the speech recognition method in this application may be completed by using a hardware integrated logic circuit in the processor 720 or instructions in a form of software. The foregoing processor 720 may be a general-purpose processor, a DSP, an ASIC, an FPGA or another programmable logic device, a discrete gate or transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 710. The processor 720 reads information in the memory 710, and implements, in combination with hardware of the processor, the function that needs to be performed by the unit included in the speech recognition apparatus in embodiments of this application, or performs the speech recognition method in the method embodiments of this application.

The communication interface 730 uses a transceiver apparatus, for example, but not limited to, a transceiver, to implement communication between the apparatus 700 and another device or a communication network. For example, the description file or the first path set corresponding to the description file may be obtained through the communication interface 730.

The bus 740 may include a path for transferring information between the components (for example, the memory 710, the processor 720, and the communication interface 730) of the apparatus 700.

It should be noted that although only the memory, the processor, and the communication interface are shown in the apparatus 700 shown in FIG. 9, in a specific implementation process, a person skilled in the art should understand that the apparatus 700 further includes another component necessary for implementing normal operation. In addition, according to a specific requirement, a person skilled in the art should understand that the apparatus 700 may further include a hardware component for implementing another additional function. In addition, a person skilled in the art should understand that the apparatus 700 may alternatively include only components necessary for implementing embodiments of this application, and does not need to include all the components shown in FIG. 9.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiments. Details are not described herein again.

In several embodiments provided in this application, it should be understood that the disclosed systems, apparatuses, and methods may be implemented in another manner. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program encoding, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

obtaining a first speech text;

obtaining, based on the first speech text, first modal information that matches the first speech text, wherein a modality indicated by the first modal information is a first modality in a plurality of preset modalities; and determining, based on the first speech text and the first modal information, a first intention and a first slot that are indicated by the first speech text when the first speech text matches the first modal information, wherein the first intention is an executable intention supported by a system handling the method, and wherein the first slot is a slot holding data needed as input for executing the first intention;

wherein the obtaining, based on the first speech text, the first modal information that matches the first speech text comprises:

obtaining a multimodal selection vector based on the first speech text; and obtaining the first modal information based on the multimodal selection vector; and wherein the obtaining the multimodal selection vector based on the first speech text comprises:

determining a first context category to which the first speech text belongs; and obtaining the multimodal selection vector based on the first context category and a first mapping matrix, wherein the multimodal selection vector indicates a probability of relevance between the first context category and each of the plurality of preset modalities, wherein the first mapping matrix indicates a plurality of context categories and a plurality of multimodal selection vectors, wherein each multimodal selection vector indicates one or more modalities, and wherein categories of the plurality of context categories are in a one-to-one correspondence with multimodal selection vectors of the plurality of multimodal selection vectors.

2. The method according to claim 1, further comprising:

obtaining modal information of the plurality of preset modalities.

3. The method according to claim 2, further comprising:

obtaining the first modal information based on the multimodal selection vector and the modal information of the plurality of preset modalities.

4. The method according to claim 3, wherein determining the first context category to which the first speech text belongs comprises:

determining, based on the first speech text or context information of the first speech text, the first context category to which the first speech text belongs.

5. The method according to claim 4, wherein determining, based on the first speech text or context information of the first speech text, the first context category to which the first speech text belongs comprises:

obtaining a text feature code of the first speech text or the context information of the first speech text; and determining, based on the text feature code and a first classification layer, the first context category to which the first speech text belongs, wherein the first classification layer is used to map the first speech text to one of a plurality of preset context categories.

6. The method according to claim 5, wherein the first modal information comprises a first modal feature code; and wherein determining, based on the first speech text and the first modal information, the first intention and the first slot that are indicated by the first speech text when the first speech text matches the first modal information comprises:

determining, based on the text feature code, the first modal feature code, and a second classification layer, the first intention and the first slot that are indicated by the first speech text in the first modality, wherein the second classification layer is used to map the first speech text to one of a plurality of preset intentions.

7. An apparatus, comprising:

at least one processor; and at least one computer-readable storage medium storing a program that is executable by the at least one processor, the program comprising instructions for:

obtaining a first speech text;

obtaining, based on the first speech text, first modal information that matches the first speech text, wherein a modality indicated by the first modal information is a first modality in a plurality of preset modalities;

determining, based on the first speech text and the first modal information, a first intention and a first slot that are indicated by the first speech text when the first speech text matches the first modal information, wherein the first intention is an executable intention supported by the apparatus, and wherein the first slot is a slot holding data needed as input for executing the first intention;

wherein the instructions for the obtaining, based on the first speech text, the first modal information that matches the first speech text comprise instructions for:

obtaining a multimodal selection vector based on the first speech text; and obtaining the first modal information based on the multimodal selection vector; and wherein the instructions for the obtaining the multimodal selection vector based on the first speech text comprises:

determining a first context category to which the first speech text belongs; and obtaining the multimodal selection vector based on the first context category and a first mapping matrix, wherein the multimodal selection vector indicates a probability of relevance between the first context category and each of the plurality of preset modalities, wherein the first mapping matrix indicates a plurality of context categories and a plurality of multimodal selection vectors, wherein each multimodal selection vector indicates one or more modalities, and wherein categories of the plurality of context categories are in a one-to-one correspondence with multimodal selection vectors of the plurality of multimodal selection vectors.

8. The apparatus according to claim 7, wherein the program further comprises instructions for:

obtaining modal information of the plurality of preset modalities.

9. The apparatus according to claim 8, wherein the program comprises instructions for:

obtaining the first modal information based on the multimodal selection vector and the modal information of the plurality of preset modalities.

10. The apparatus according to claim 9, wherein the program comprises instructions for:

determining, based on the first speech text or context information of the first speech text, the first context category to which the first speech text belongs.

11. The apparatus according to claim 10, wherein the program comprises instructions for:

obtaining a text feature code of the first speech text or the context information of the first speech text; and determining, based on the text feature code and a first classification layer, the first context category to which the first speech text belongs, wherein the first classification layer is used to map the first speech text to one of a plurality of preset context categories.

12. The apparatus according to claim 11, wherein the first modal information comprises a first modal feature code; and wherein the program comprises instructions for:

determining, based on the text feature code, the first modal feature code, and a second classification layer, the first intention and the first slot corresponding to the first intention that are indicated by the first speech text in the first modality, wherein the second classification layer is used to map the first speech text to one of a plurality of preset intentions.

13. The apparatus according to claim 7, wherein the program further comprises instructions for:

performing an operation related to the first intention.

14. A non-transitory computer readable storage medium storing instructions that are executable by at least one processor, the instructions comprising instructions for:

obtaining a first speech text;

obtaining, based on the first speech text, first modal information that matches the first speech text, wherein a modality indicated by the first modal information is a first modality in a plurality of preset modalities; and determining, based on the first speech text and the first modal information, a first intention and a first slot that are indicated by the first speech text when the first speech text matches the first modal information, wherein the first intention is an executable intention supported by a system performing the instructions, and wherein the first slot is a slot holding data needed as input for executing the first intention;

wherein the obtaining, based on the first speech text, the first modal information that matches the first speech text comprises:

obtaining a multimodal selection vector based on the first speech text; and obtaining the first modal information based on the multimodal selection vector; and wherein the obtaining the multimodal selection vector based on the first speech text comprises:

determining a first context category to which the first speech text belongs; and obtaining the multimodal selection vector based on the first context category and a first mapping matrix, wherein the multimodal selection vector indicates a probability of relevance between the first context category and each of the plurality of preset modalities, wherein the first mapping matrix indicates a plurality of context categories and a plurality of multimodal selection vectors, wherein each multimodal selection vector indicates one or more modalities, and wherein categories of the plurality of context categories are in a one-to-one correspondence with multimodal selection vectors of the plurality of multimodal selection vectors.

* * * * *